United States Patent [19]

Nunberg et al.

[11] Patent Number: 5,111,398

[45] Date of Patent: May 5, 1992

[54] PROCESSING NATURAL LANGUAGE TEXT USING AUTONOMOUS PUNCTUATIONAL STRUCTURE

[75] Inventors: Geoffrey D. Nunberg, San Francisco; H. Tayloe Stansbury, Mountain View; Curtis Abbott, Menlo Park; Brian C. Smith, La Honda, all of Calif.

[73] Assignee: Xerox Corporation, Stamford, Conn.

[21] Appl. No.: 274,158

[22] Filed: Nov. 21, 1988

[51] Int. Cl.$^5$ .............................................. G06F 15/38
[52] U.S. Cl. ................................ 364/419; 364/225.6; 364/225.8; 364/DIG. 1
[58] Field of Search .............. 364/419, 200 MS File, 364/900 MS File, 300, 225.6, 225.8, 226.1, 226.4, 920.4

[56] References Cited

U.S. PATENT DOCUMENTS

| | | | |
|---|---|---|---|
| 4,586,160 | 4/1986 | Amano et al. | 364/900 |
| 4,594,686 | 6/1986 | Yoshida | 364/900 |
| 4,597,057 | 6/1986 | Snow | 364/900 |
| 4,599,691 | 7/1986 | Sakaki et al. | 364/419 |
| 4,641,264 | 2/1987 | Nitta et al. | 364/900 |
| 4,674,065 | 6/1986 | Lange et al. | 364/900 |
| 4,773,009 | 9/1988 | Kucera et al. | 364/419 |
| 4,821,230 | 4/1989 | Kumano et al. | 364/900 |
| 4,958,285 | 9/1990 | Tominaga | 364/419 |
| 4,964,030 | 10/1990 | Suzuki et al. | 364/419 |

FOREIGN PATENT DOCUMENTS

| | | |
|---|---|---|
| 0180888 | 5/1986 | European Pat. Off. . |
| 0230339 | 7/1987 | European Pat. Off. . |
| 0240909 | 10/1987 | European Pat. Off. . |
| 361570A | 4/1990 | European Pat. Off. . |
| 361737A | 4/1990 | European Pat. Off. . |
| 361820A | 4/1990 | European Pat. Off. . |

OTHER PUBLICATIONS

*Text Editing*, Xerox Corporation, 1985, pp. 47–56.
Kaplan, R. M. and Bresnan, J., "Lexical-Functional Grammar: A Formal System for Grammatical Representation", in Bresnan, J. (ed.), *The Mental Representation of Grammatical Relations*, Cambridge, MIT Press, 1982, pp. 173–281.
*Xerox LISP Release Notes, Lyric Release*, Xerox Corporation, 1987, pp. 21–23 and Appendix B.
Dixon, M., "SEdit; An Extensible Structured Data Editor for Interlisp-D", Jun. 17, 1986, Sections 1–4.
"Getting it Right", Macworld, Aug. 1988, pp. 145, 147.
Rosenthal, S., "Yes PC Fans, They Still make Typewriters", *San Francisco Examiner*, Mar. 27, 1988.
*Text Editing and Processing*, Symbolics, Inc., #999020, Jul. 1986, pp. 24–31 and 63–111.

*Primary Examiner*—Jerry Smith
*Assistant Examiner*—Steven Kibby
*Attorney, Agent, or Firm*—James T. Beran

[57] ABSTRACT

A technique for processing natural language text uses a data structure that includes structure data in the text data. The structure data indicates an autonomous punctuational structure of the text, a punctuational structure that is independent of the lexical content of the text and therefore can be manipulated without considering the meaning of the words in the text. The data structure can be a tree in which each node has a textual type such as a paragraph, sentence, clause, phrase, or word. The data structure could alternatively be parallel data sequences, one with codes indicating the text's characters and the other with codes indicating textual types. The data structure is produced and maintained using a grammar of textual types, indicating for each textual type the textual types of units into which it can properly be divided. During editing, a text sequence is generated by applying rendering rules to the data structure, and the text is presented to the user based on the text sequence. Prior to generating the text sequence, information relating to punctuational features is propagated through the data structure. User signals requesting editing operations are applied to modify the data structure using operations rules, and the user's pointing or selecting signals are mapped onto the data structure. The modified data structure is checked with the grammar of textual types to ensure that it has an autonomous punctuational structure. A modified text sequence is then generated, and a modified text is displayed based on it.

31 Claims, 12 Drawing Sheets

Microfiche Appendix Included
(113 Microfiche, 2 Pages)

PROCESSING NATURAL LANGUAGE TEXT USING AUTONOMOUS PUNCTUATIONAL STRUCTURE

Microfiche appendices: Appendix A includes one (1) microfiche with 57 frames; Appendix B includes one (1) microfiche with 62 frames. Appendix A and Appendix B are both incorporated herein by reference.

BACKGROUND OF THE INVENTION

The present invention relates to techniques for processing natural language text that take into account its punctuation. More specifically, the invention relates to data structures that include information about the punctuational structure of natural language text.

Conventional data processing techniques for natural language ordinarily treat text as a sequence of codes. The codes used include alphabetic and numeric character codes as well as punctuation mark codes and carriage-control codes that indicate carriage operations such as spaces, tabs and carriage returns. When the text is presented, by printing or display, these codes control the placement of alphanumeric characters and other marks and symbols.

A number of non-printing characters that facilitate text editing, document layout, and page formatting are described on pages 52-56 of *Text Editing*, VP Series Reference Library, Version 1.0, Xerox Corporation, 1985, pp. 47-56, describing the ViewPoint Document Editor available from Xerox Corporation. A user can display these characters during editing, for example, for use in document formatting and layout. The characters described include special formatting characters, such as spaces, tabs, and new paragraph characters. The characters also include structure characters, including page format characters, field bounding characters, and frame anchors.

The ViewPoint Document Editor also enables the user to select and operate on units of text based on the codes corresponding to these non-printing characters. For example, as described at pages 47-52 of *Text Editing*, text can be selected in units of characters, words, sentences or paragraphs using multiple mouse button clicks. The editor uses special rules to interpret text as words or sentences. The rules treat each grouping of text characters as a word, and include spaces depending on the presence or absence of a trailing space and a leading space. The rules treat each sequence of words and symbols that is bounded by punctuation marks as a sentence, and include spaces depending on the presence or absence of spaces after the trailing punctuation mark and before the first character of the sentence.

Various other commercial products have features similar to those of ViewPoint, including selection commands from the keyboard or with a mouse or similar pointer control device. Conventionally, a single click with a pointer control device button selects a region that starts at the character boundary nearest the position of the pointer at the time of the click. In one approach, the region selected by a single click contains no characters, but may be extended one character at a time by moving the pointer over the characters to be added. In another approach, the region selected by a single click contains one character, and may be extended arbitrarily by a single click of a different button with the pointer at the desired ending point of the selection.

It is also conventional to provide selection by double-clicking, or clicking twice in succession with the pointer at the same position. Double-clicking usually selects the word most closely surrounding the pointer position, and subsequent adjustments of the selection are usually made a word at a time. For example, the MacIntosh personal computer from Apple Corporation provides a user interface in which multiple clicking selects a word. Word, a commercial text editor from Microsoft Corporation, provides extension of such a selection to additional full words. Microsoft Word and other text editors, including WordPerfect from WordPerfect Corporation and Emacs available with source code from Free Software Foundation, Cambridge, Mass., allow selection of a sentence and extension of such a selection to additional full sentences. Microsoft Word and Fullwrite Professional from Ashton-Tate Corporation further allow selection by paragraph. Fullwrite Professional also allows the user to provide a quotation mark without indicating whether it is at the open or close of a quote, the software correctly providing an open or close quotation mark based on previous marks.

*Text Editing and Processing*, Symbolics, Inc., #999020, July 1986, pp. 24-31 and 63-111, describes text editing features of a version of Emacs called "Zmacs." Pages 67-70 describe mouse operations, including clicking on a word to copy the whole word; on a parenthesis to copy it, its matching parenthesis, and the text between them; on a quotation mark to copy it, its matching quotation mark, and the text between them; or after or before a line to copy the whole line. Appropriate spaces are placed before inserted objects, so that spaces are automatically inserted around an inserted word or sentence. Pages 71-75 describe motion commands, including motion by word, meaning a string of alphanumeric characters; by sentence, ending with a question mark, period, or exclamation point that is followed by a newline or by a space and a newline or another space, with any number of closing characters between the sentence ending punctuation and the white space that follows; and by line, delimited by a newline. Page 79 describes motion by paragraph, delimited by a newline followed by blanks, a blank line, or a page character alone on a line; page 80 describes motion by page, delimited by a page character. Chapter 5, pages 83-97, describes deleting and transposing text, with pages 87-89 describing how contents of a history are retrieved. Chapter 6, pages 99-111, describes working with regions, and discusses point and mark.

Conventional line-breaking and pagination techniques take punctuation into account. These techniques apply rules to the sequence of codes to determine break points between lines or pages.

Kaplan, R. M. and Bresnan, J., "Lexical-Functional Grammar: A Formal System for Grammatical Representation," in Bresnan, J. (Ed.), *The Mental Representation of Grammatical Relations*, Cambridge, MIT Press, 1982, pp. 173-281, describe in section 4.1 how to assign a structure to a sentence by following the ordinary rewriting procedure for context-free grammars for a set of rules. Section 6 shows that functional structure in lexical-functional grammar (LFG) is an autonomous level of linguistic description, with a mixture of syntactically and semantically motivated information but distinct from both constituent structure and semantic representation.

A variety of patent documents relate to natural language punctuation.

Kucera et al., U.S. Pat. No. 4,773,009, describe a text analyzer that analyzes strings of digitally coded text to determine paragraph and sentence boundaries. As shown and described in relation to FIGS. 3-4, each string is broken down into component words. Possible abbreviations are identified and checked against a table of common abbreviations to identify abbreviations that cannot end a sentence. End punctuation and the following string are analyzed to identify the terminal word of a sentence. When sentence boundaries have been determined, a grammar checker, punctuation analyzer, readability analyzer, or other higher-level text processing can be applied.

Kumano et al., EP-A 230,339, describe a machine translation system that includes punctuation mark generation, as shown and described in relation to FIGS. 6-12C. The insertion of punctuation is based on the syntactic structure of a translated sentence.

Sakaki et al., U.S. Pat. No. 4,599,691, describe a tree transformation system for machine translation of natural language. A sentence is pre-processed and processed taking into account its end mark and using parsing grammars illustrated at col. 6, lines 22-57. The result is a tree structure, as shown and described in relation to FIGS. 1-5. Tree fragments are used in translation, as described in the remainder of the patent.

Nitta et al., U.S. Pat. No. 4,641,264, describe a natural language translation method in which a sentence is analyzed into phrases, as shown and described in relation to FIG. 2, in the process of translation. As shown in Table 1A, commas and periods are treated as parts of speech. A tree/list analysis pattern storage area includes pattern tables for verbs, conjunctions, clauses, and sentences, examples of which are shown and described in relation to FIGS. 8A-8D. These patterns are used in the process of obtaining a sentence's skeleton pattern, which is then used in translation.

Katayama et al., EP-A 180,888, describe natural language processing techniques that use a dictionary of grammatical rules based on categories such as predicate, noun, etc., as shown and described in relation to Table 4. The grammatical rules are used to process a sentence, as shown and described in relation to FIG. 4, until an end mark is reached. Semantic analysis, as shown and described in relation to FIG. 6, is also used to obtain a syntax tree, as shown in FIG. 7.

Amano et al., U.S. Pat. No. 4,586,160, describe techniques for analyzing a natural language sentence's syntactic structure. The syntactic category of each word in a sentence is obtained by consulting a dictionary, but if the word is not in the dictionary, a category is supplied independently of the dictionary. As discussed at col. 2, lines 59-64, the position of a punctuation mark is also noted. As shown and described in relation to FIGS. 2 and 3, the words are combined to form upper order sentence units.

Yoshida, U.S. Pat. No. 4,594,686, describes an electronic language interpreter. FIG. 3 shows memory contents representing information about inflection of an adjective, specifically relating to addition of an umlaut. As shown in relation to Tables 1-4, the appropriate inflection of a word depends on how it is used. A first memory stores uninflected forms of words in one language. A second memory stores words in a second language equivalent to each word in the first memory. A third memory contains data indicating inflection principles used to properly inflect the forms in the first memory based on inflection selection by the user.

Snow, U.S. Pat. No. 4,597,057, describes a text compression system in which a punctuation sequence, including common punctuation marks, spaces, tabs, end of line sequences, form feeds, capitalization, underlining and so forth, is encoded as a punctuation token, as shown and described in relation to FIGS. 1, 2, and 9.

Lange et al., U.S. Pat. No. 4,674,065, describe a system for automatically proofreading a document for word use validation. As shown and described in relation to Table 3, the rules for inspecting text surrounding a potentially confusable word take punctuation into account, including period, comma, blank and capitals.

SUMMARY OF THE INVENTION

The present invention provides data structures that include data indicating autonomous punctuational structure of natural language text. These data structures can be used in a variety of ways for processing natural language text. The present invention further provides techniques for processing natural language text using a grammar of textual types.

One aspect of the invention relates to a well-known problem in conventional approaches to punctuation of natural language text. Conventional systems include punctuation mark codes, space codes, carriage-control codes and other codes in a sequence of characters in a text, as described above in relation to the ViewPoint Document Editor. During processing of the text, structural features of the text, such as the break points between words, sentences, lines, paragraphs or pages may be inferred from the sequential positions of the punctuation marks and other codes. But the conventional algorithms often make inaccurate inferences about the structure of text.

One example is the use of multiple clicking to grow a selection outward. A selection could begin with a character and grow to a word, to a sentence, and to a paragraph. As noted on page 52 of *Text Editing*, above, the results of multiple clicking may not be desirable, in which case the user must use another select method. And even when the user requests an operation on a selection that results in modification of the text, it may be necessary for the user to perform a number of additional operations to correct punctuation, spacing, capitalization, and so forth. These additional operations complicate the manipulation of text.

This aspect of the invention is based on the recognition of an underlying problem with the conventional algorithms. The conventional algorithms use codes or other data relating to the presentation of the text as the basis for dividing the text into units such as words, sentences, lines, paragraphs, or pages. They use specialized search routines to find the boundaries of a word, sentence, paragraph, or other unit of text. Unfortunately, this frequently fails, primarily for two reasons: First, some distinguishing marks of punctuation are ambiguous and can lead the search routines to find an incorrect boundary; for example, the period at the end of an abbreviation may be mistaken for the period at the end of a sentence. Second, the user is permitted to make changes that leave the document incorrectly or ambiguously punctuated and can similarly lead to incorrect boundary finding; for example, deletion of a period at the end of a sentence can leave the sentence incorrectly punctuated and can also result in failure to distinguish the sentence from the following sentence. These incorrect results reduce editing efficiency and can lead to presentation of improperly punctuated text.

This aspect is further based on the discovery that one way to deal with this difficulty is to use a data structure that includes data indicating an autonomous punctuational structure of a text. This punctuational structure is autonomous in the sense that it defines the distribution of one or more punctuational features in the text and the dependencies between them without reference to the lexical content of the text. With such a data structure, it is easy to ensure that operations by the user lead from one punctuationally correct structure to another. It is furthermore possible to create such a data structure from unstructured text, and to present correctly punctuated text based on the data structure. In other words, a relatively simple set of rules can be used to transform in either direction between presentation of text and an autonomous punctuational data structure.

Programming languages are conventionally treated as having a punctuational structure. Code in such a language can conventionally be edited with a structure editor. For example, a version of Lisp available from Envos Corporation, 1157 San Antonio Road, Mountain View, Calif., includes SEdit, an editor that can edit punctuational structure for two variants of the Lisp programming language, Interlisp and Common Lisp, as described in *Xerox LISP Release Notes, Lyric Release*, Xerox Corporation, 1987, pp. 21-23 and Appendix B. Dixon, M., "SEdit: An Extensible Structured Data Editor for Interlisp-D," Jun. 17, 1986, Sections 1-4, incorporated herein by reference, describes additional features of SEdit. Lisp and other programming languages are designed, however, to have rigidly defined and relatively simple syntactic structures. Furthermore, such a syntactic structure has a rigidly defined and unambiguous relationship to the punctuation required for presentation. Natural language, on the other hand, has evolved without such a design and, prior to the present invention, it was not known that natural language could be treated as if it had such a punctuational structure.

A closely related aspect of the invention results from a technique used to obtain the set of rules described above. It has been discovered that a punctuational structure of natural language text can be obtained that obeys a set of rules defining how the text may be divided into units such as words, phrases, clauses, quotations, parentheticals, sentences, paragraphs and so forth, each of which is independent of lexical content. Nesting relationships between such text units can be defined such that structure data indicating those relationships define the punctuational features. A text unit at a lower level can be linked by structure data to a text unit at a higher level within which it is nested such that the structure data defines the distribution and dependencies of one or more punctuational features without reference to the lexical content of the linked text units.

A further elaboration is that if the text units are categorized into textual types independent of lexical content, the rules can be made dependent on the textual types. Specifically, a grammar of textual types can be provided in which each rule indicates the textual types of units into which a text unit of a given textual type can be divided. Such a grammar of textual types can be used in various ways in the processing of natural language text.

A grammar of textual types can, for example, be used in transforming between a text that includes presentation codes and an autonomous punctuational data structure representing that text and its punctuational structure. The grammar can be used in analyzing the version with presentation codes into text units and their nesting relationships. The textual types of the grammar can also be used in determining from the autonomous punctuational data structure what presentation codes should be inserted into the text for presentation. Structure codes can be included to indicate the textual type of each text unit, with the text units organized according to their nesting relationships. If the text units are in sequence, the structure data could alternatively be included in a parallel sequence, with each structure unit corresponding to one of the text units and including its structure code. The grammar can further be used when the data structure is changed, to ensure that the modified data structure remains correct.

Further aspects of the invention are based on the recognition that autonomous punctuational data structures according to the invention can be employed in a variety of techniques for processing natural language text. A processor can access the data structure to retrieve the text data, and the processor can then generate a sequence of codes by including punctuation codes in accordance with the structure data. Prior to generating the sequence of codes, the processor can propagate information relating to punctuational features through the data structure. The processor can display the text to a user based on the sequence of codes, and the user can, through a keyboard with a mouse or through another input device, provide signals including selection data indicating a selected part of the text; this selection data can then be mapped onto the text data to identify the selected part. The user can also provide data indicating an operation to be performed on the selected part, in response to which the processor performs the indicated operation by modifying the text data in the data structure while maintaining the data structure as an autonomous punctuational data structure. The processor can then retrieve the modified text data and generate a modified text with punctuation mark codes according to the structure data in the modified text data. With the operation data, the user can provide position data indicating a position within the text at which to perform the operation; in response, the processor maps the position data onto the text data to identify the corresponding position, and performs the operation at that position.

These and other objects, features and advantages of the invention will be more apparent from the following description, together with the drawings and claims.

DETAILED DESCRIPTION

1. Glossary

Figure 1:
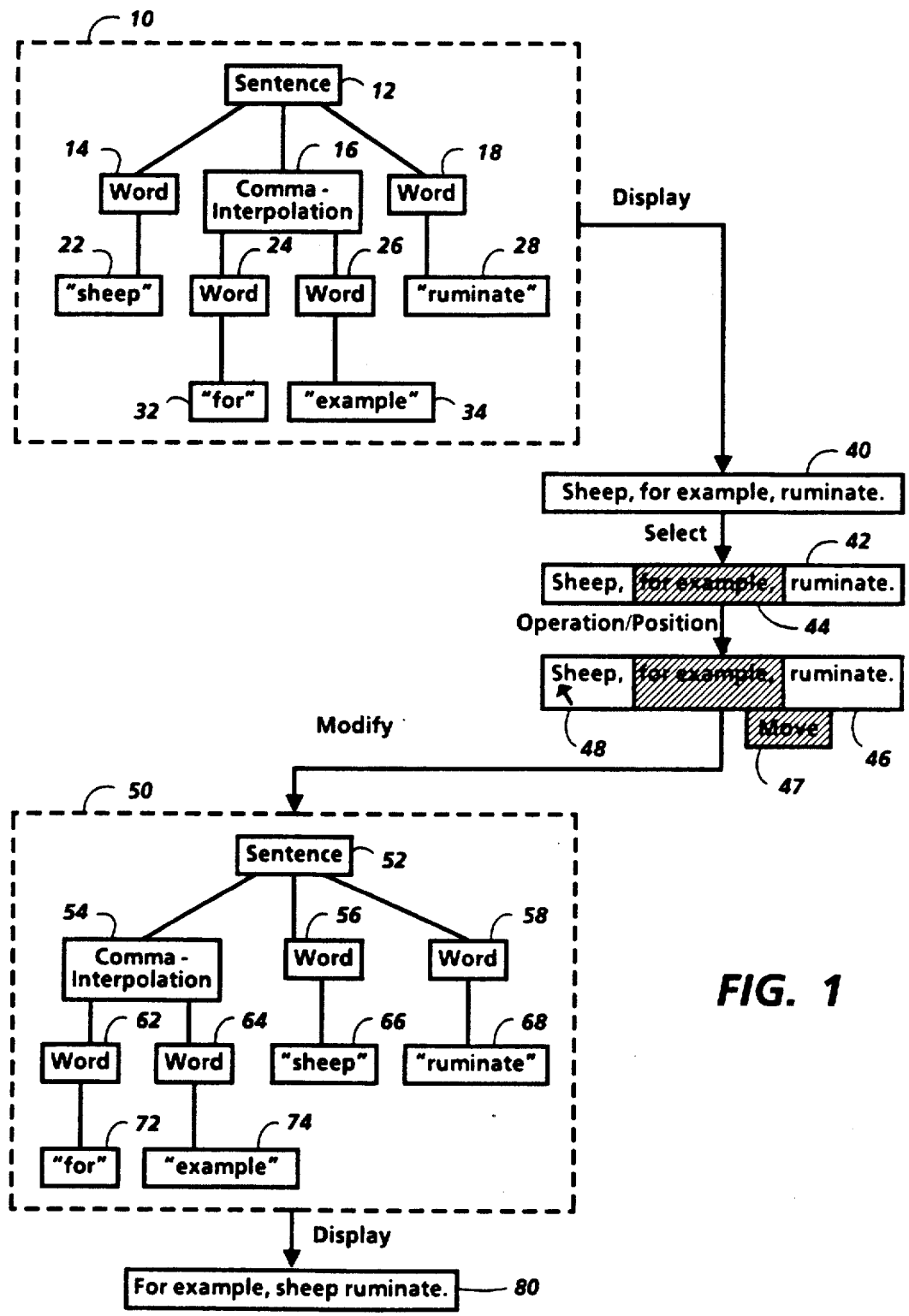
FIG. 1 shows schematically an editing technique applicable to a data structure with an autonomous punctuational structure according to the invention.

As used herein, the following terms have the meanings indicated:

"Text" means an arrangement of written words, ordinarily a sequence.

"Written words" means words recorded in the form of discrete elements such as characters, codes or the like. Words recorded in a continuous form such as recorded continuous speech are therefore not written words. A text may thus include zero or more words, each with at least one discrete element.

"Natural language text" means a text of one of the natural languages, such as English.

A "unit of text" is a unit into which text can be divided.

A "textual type" is a category of units of text that has syntactic or semantic significance, but not lexical significance. In English, "word," "phrase," "clause," "quotation," "parenthetical," "sentence," and "paragraph," are categories of text units that usually have syntactic or semantic significance but need not have lexical significance. In contrast, some categories of text units, in addition to syntactic or semantic significance, also have lexical significance because they relate to the distribution of and dependencies among lexical elements of the text. These lexical categories include "predicate," "noun," "adjective," "singular," "plural," "possessive," "past tense," "subject," "object," and so forth. In general, lexical categories like these relate to affixes and other inflectional and derivative processes applicable to words. In further contrast, some non-lexical categories of text units such as "line" and "page" usually do not even have syntactic or semantic significance, much less lexical significance. A specific token or instance of a textual type may be referred to herein as a "textual type unit," to distinguish from other units of text.

A "textual type rule" is a rule whose applicability depends on textual type. In other words, if a text is divided into textual type units, a textual type rule will apply to those units that are instances of certain textual types but not to units of other types.

A "grammar of textual types" is a set of textual type rules in which each rule indicates, for any textual type unit of a respective textual type, textual types of textual type units into which that unit can be divided. In addition, a "grammar of textual types" defines all and only the acceptable divisions of textual type units.

A "punctuational feature" of a text is a feature that relates to one or more textual type units and that depends on the syntactic or semantic significance of the related textual type units. For example, a punctuational feature may indicate a grouping of textual type units, a nesting of one textual type unit within another, a separation between textual type units, a delimiting of a textual type unit, or a highlighting or other emphasis of a textual type unit. Features ordinarily used as punctuational features in English include nonalphanumeric typographical features such as spaces and punctuation marks, including commas, periods, semicolons, colons, dashes, quotation marks, parentheses, brackets, underlining, and so forth; features of alphanumeric elements such as case or font; and features of format such as carriage returns, tabs, centering, and indentation.

A "punctuational structure" of a text is a structure that includes punctuational features of the text. Text, as conventionally presented for viewing and editing, is based on a data structure that includes data, such as punctuation mark codes, indicating punctuational structure. If the user changes such a punctuational structure by changing a punctuational feature delimiting a clause in a sentence, for example, the user may also find it necessary to change other punctuational features delimiting that clause or other clauses. This is because the punctuational structure indicated by the punctuation mark codes and other such data cannot always be changed without reference to the lexical content of the text. In other words, reference to the words in the text is sometimes necessary to resolve ambiguities in the meaning of a change in the punctuational structure.

In contrast, an "autonomous punctuational structure" is a punctuational structure that is sufficient to define the distribution of punctuational features in the text and the dependencies between those punctuational features without reference to the lexical content of the text. In other words, an autonomous punctuational structure indicates where in a text punctuation marks, spaces, and other punctuational features may be inserted, independent of the words in the text.

An "autonomous punctuational grammar" is a grammar of textual types whose textual types can be related by an autonomous punctuational structure. In other words, if a text is divided in a manner that obeys an autonomous punctuational grammar, the text units within the text can be related by an autonomous punctuational structure that defines the distribution of punctuational features and their dependencies without reference to the lexical content of the text.

In a data structure, "text data" means data representing a natural language text. Text data are often encoded using standard printing or display codes that include alphanumeric codes, punctuation mark codes, capitalization codes, carriage-control codes, and so forth. Text data can, however, be encoded in a wide variety of other ways. For example, text data can be encoded as a bitmap.

In a data structure that includes text data, the terms "structure data" or "structure codes" mean data indicating punctuational features of the natural language text represented by the text data. An "autonomous punctuational data structure" has text data including structure data indicating an autonomous punctuational structure of the corresponding text.

2. General Features

Figure 2:
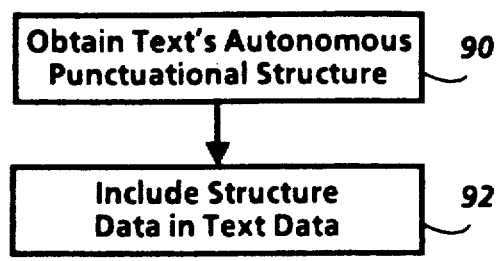
FIG. 2 is a flow chart showing general steps of producing a data structure with structure data indicating an autonomous punctuational structure according to the invention.
Figure 3:
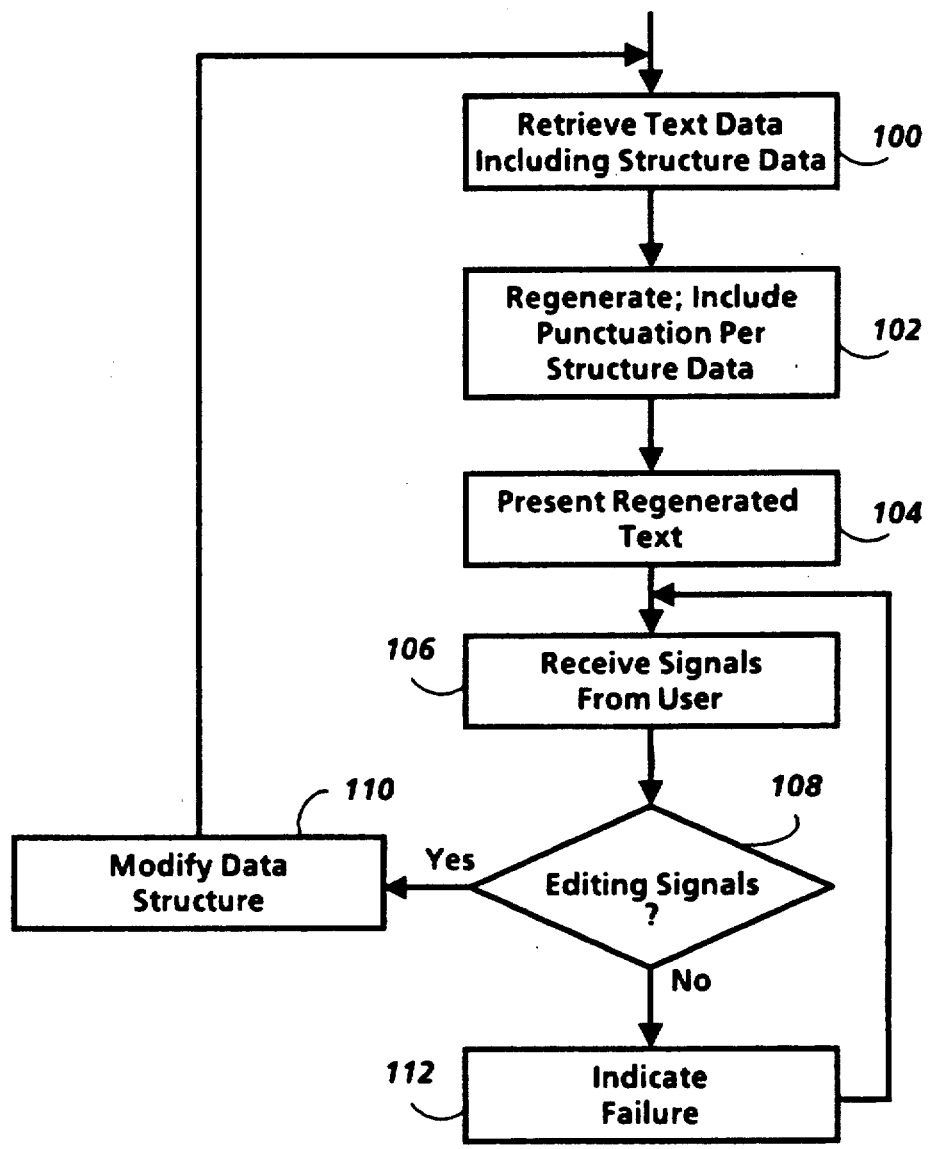
FIG. 3 is a flow chart showing general steps of using an autonomous punctuational data structure according to the invention.
Figure 4:
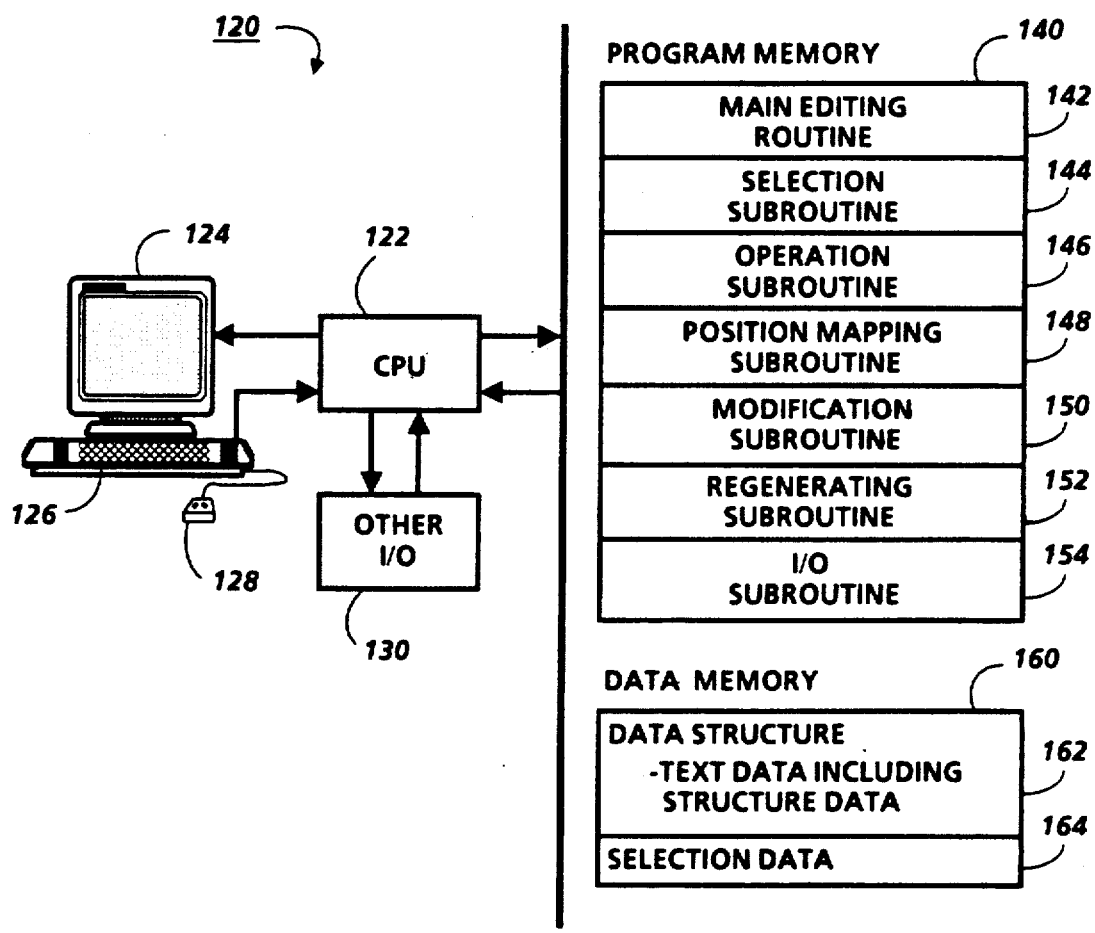
FIG. 4 is a block diagram of a system including an autonomous punctuational data structure according to the invention.

FIGS. 1-4 illustrate several general features of the invention. FIG. 1 is a flow diagram showing performance of an editing operation on a data structure according to the invention. FIG. 2 is a flow chart showing general steps of a method that produces a data structure according to the invention. FIG. 3 is a flow chart showing general steps of a method of using such a data structure. FIG. 4 is a block diagram showing general components of a system including such a data structure.

The editing operation in FIG. 1 begins with data structure 10, represented graphically as a number of linked data units, some indicating textual types and others indicating text data. Data structure 10 represents the natural language sentence "Sheep, for example, ruminate." Sentence data unit 12 links to data units 14, 16 and 18, indicating respectively the textual types word, comma-interpolation, and word. Word data units 14 and 18 link respectively to text data unit 22 for the word "sheep" and text data unit 28 for the word "ruminate." Comma-interpolation data unit 16, on the other hand, links to word data units 24 and 26, which in turn link respectively to text data unit 32 for the word "for" and text data unit 34 for the word "example." Data structure 10 thus includes both text data and structure data. As discussed below, FIG. 1 illustrates that the structure data indicates an autonomous punctuational structure of the sentence "Sheep, for example, ruminate."

In order to edit text, a user should be able to see the text being edited. A preliminary step shown in FIG. 1 is to display the sentence shown in box 40: "Sheep, for example, ruminate." This can be done by applying a set of rules based on the grammar of textual types to determine what punctuational features should be inserted into the text. For example, if the rules indicate that the first word of a sentence begins with a capital letter, then the word "sheep" is capitalized, as shown. Similarly, if the rules so indicate, a comma-interpolation in the middle of a sentence is preceded and followed by a comma and a space. The rules may also indicate, however, that adjacent words within a comma-interpolation are separated by a space, so that a space is inserted between "for" and "example." Finally, if the rules indicate that the final word of a sentence is followed by a period, then a period is inserted after "ruminate" as shown.

When text is displayed, the user can modify it, by selecting a part of the text and indicating an operation to be performed on that part and, if appropriate, a position for the operation. Box 42 shows the same sentence after the user has selected the words "for example." A selection could be made in any appropriate way, including mouse clicks indicating the beginning and end of the selection. After selection, the selected words appear within highlighted area 44 so that the user can identify the selection and ensure that it has been correctly made. Box 46 further shows operation selection 47, by which the user has requested that a move operation be performed on the selection. Box 46 also shows pointer 48, with which the user is indicating a position for the requested move operation. The user has thus requested that the words "for example" be moved from the middle of the sentence to the beginning.

In response to the user request shown in box 46, the system modifies data structure 10 by making comma-interpolation data unit 16 the first data unit depending from sentence data unit 12. Data structure 50 results, with sentence data unit 52 corresponding to sentence data unit 12; comma-interpolation data unit 54 to data unit 16; word data units 56, 58, 62 and 64 to data units 14, 18, 24 and 26, respectively; and text data units 66, 68, 72 and 74 to data units 22, 28, 32 and 34, respectively. In other words, the data units in data structure 50 are the same as those in data structure 10, but the links between them, which correspond to structure data indicating punctuational structure, have changed in a way that maintains data structure 50 as an autonomous punctuational data structure. The structure data now indicates the sentence "For example, sheep ruminate."

From data structure 50, the system can again obtain a sentence for display, shown in box 80. Again, the rules may require capitalization of the first word of the sentence, which is now "for." The rules may also indicate that a comma-interpolation at the beginning of a sentence should be followed by a comma and a space and that words within a comma-interpolation should be separated by a space, so that these punctuational features are inserted as shown. They may also indicate that words within a sentence should be separated by a space, so that a space is inserted between "sheep" and "ruminate," as shown. Finally, a period is inserted after the final word of a sentence, as shown.

As a result of the technique illustrated in FIG. 1, no additional operations by the user are necessary to obtain a correctly punctuated sentence. In contrast, in most conventional text editors, the user must go over the text after requesting an operation, making a number of changes in capitalization, punctuation marks, and spacing. These changes are necessary because the underlying data structure conventionally does not include structure data indicating an autonomous punctuational structure of the text. Therefore, if the user makes a change in the data structure, punctuational problems may be introduced that cannot be resolved without reference to the lexical content of the text. If the data structure includes structure data indicating an autonomous punctuational structure and if the data structure is modified so as to maintain it as autonomous, on the other hand, the system is still able to supply correct punctuation after a feature is changed.

FIG. 2 illustrates the general steps of a technique for producing a data structure with structure data indicating an autonomous punctuational structure for a text. The text could be obtained from any source, including keyboard input or a stored text file. The text's autonomous punctuational structure is obtained, in box 90. Then, structure data indicating that structure are included in text data representing the text, in box 92. Specific techniques for performing each of these steps are discussed in more detail below.

FIG. 3 illustrates general steps of a technique for using a data structure produced with the technique of FIG. 2. The step in box 100 accesses the data structure and retrieves from it the text data, including the structure data. The step in box 102 then regenerates the text from the text data, punctuating it according to the punctuational features indicated by the structure data. The regenerated text is presented to a user in box 104, enabling a user to edit it as discussed above in relation to FIG. 1.

In box 106, signals are received from the user. The technique of FIG. 3 then branches based on whether the signals received from the user are appropriate editing signals, in box 108. Examples of editing signals include signals selecting a position or part of the text, indicating characters to be added at a selected position, or requesting some other operation to be performed on a selected part of the text. Upon receiving editing signals that can be applied to the data structure, the step in box 110 modifies the data structure accordingly, maintaining it as an autonomous punctuational data structure. After modifying the data structure, the technique can return to the step in box 100 to retrieve the modified text data, and regenerate and display the modified text. On the other hand, if the signals from the user are not appropriate editing signals, a signal indicating failure is provided in box 112 before returning to receive further signals from the user in box 106.

FIG. 4 shows general components of system 120 that includes a data structure with structure data indicating an autonomous punctuational structure. System 120 includes a central processing unit (CPU) 122 that controls display 124 to present text to a user and that receives user signals through keyboard 126 and mouse 128. CPU 122 can also send and receive signals from other I/O devices 130, such as a printer, a network, and so forth.

CPU 122 can retrieve data from and store data in memory, which includes program memory 140 and data memory 160. Program memory 140 includes main editing routine 142, which calls a number of subroutines during editing. Selection subroutine 144 responds to user signals indicating a position or part of the displayed text by mapping those signals onto the corresponding position or part of the data structure; selection subroutine 144 can also cause the corresponding position to be indicated by a cursor or the corresponding part to be inverted or otherwise highlighted so that the user can see the selection. Operation subroutine 146 responds to user signals indicating an operation by performing the requested operation. If the requested operation requires a position within the text, as a move or copy operation would, operation subroutine 146 can prompt the user for a signal indicating position and can call position mapping subroutine 148, which maps the position signals to the corresponding position in the data structure. Similarly, operation subroutine 146 can call modification subroutine 150 to perform modifications of the data structure if necessary to perform a requested operation; modification subroutine 150 ensures that the modified data structure remains an autonomous punctuational data structure. When modifications are completed, regenerating subroutine 152 can be called to access and retrieve text data from the data structure and to regenerate the text from it. I/O subroutine 154 can be called to handle display of the regenerated text or other I/O operations.

Data memory 160 includes data structure 162, with text data including structure data indicating an autonomous punctuational structure. Data memory 160 can also include other temporarily stored values, such as selection data 164 indicating the current selection.

From these general features of the invention, we now turn to consider in more detail how the invention may be implemented.

3. Autonomous Punctuational Structure

The step in box 90 in FIG. 2 obtains an autonomous punctuational structure for a text. This type of punctuational structure defines the distribution and dependencies of punctuational features independently of lexical content of the text, as described above. But this type of punctuational structure is not explicit in ordinary natural language text, even though the text includes punctuation marks and other punctuational features.

In order to develop techniques for making such a punctuational structure explicit, it is useful to have a model of an autonomous punctuational structure. Data structures 10 and 50 in FIG. 1 each have such a structure, and share certain features that characterize one model of such a structure. Each has a number of levels of nodes, with a single node at the highest level, sentence data units 12 and 52; each node at a lower level is linked to one and only one node at the next higher level, such as word data units 18 and 58 linked respectively to sentence data units 12 and 52. Such a structure can be described as having an outermost textual type unit corresponding to the node at the highest level; each of the other textual type units corresponding to the lower level nodes is nested within another textual type unit, either by itself or with one or more other textual type units at an equal level of nesting. This model is thus referred to herein as a "nesting model."

The nesting model can be implemented as an autonomous punctuational structure if each link between a pair of nodes defines the distribution and dependencies of one or more punctuational features independent of the lexical content of the nodes. For example, the link in data structure 10 between data units 12 and 16 and the link in data structure 50 between data units 52 and 54 each define the distribution and dependencies of punctuational features around a comma-interpolation within a sentence, without regard to the words within the comma-interpolation or to the other words in the sentence.

Figure 5:
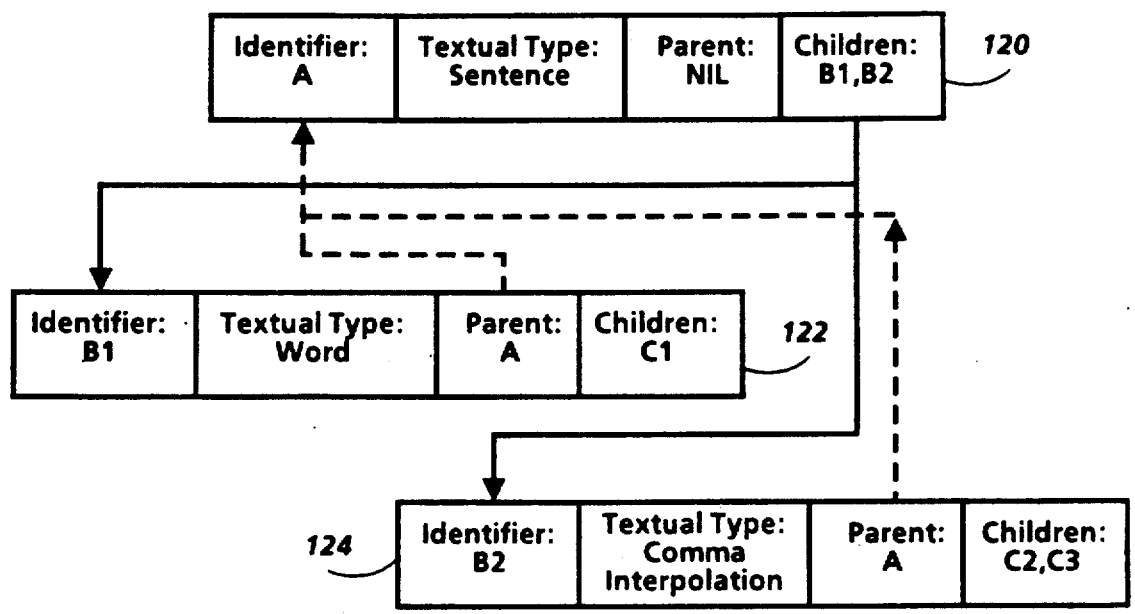
FIG. 5 is a schematic representation of data units in an implementation of an autonomous punctuational data structure according to the invention.

FIG. 5 illustrates an implementation of the nesting model in greater detail, showing why links can define the distribution and dependencies of punctuational features. In this implementation, each of data units 120, 122 and 124 corresponds to a textual type unit and each includes a number of fields with data relevant to that textual type unit and its links to other textual type units. The four fields shown are an identifier field of the data unit that can be used to access it and retrieve its contents; a textual type field indicating the textual type of the corresponding textual type type unit; a parent field indicating the identifier of this data unit's parent; and a children field indicating the identifiers of this data unit's children.

Data unit 120 is linked to each of data units 122 and 124. This link appears in FIG. 5 in the contents of the parent and children fields of the data units. The identifiers of data units 122 and 124 are B1 and B2, respectively, and these identifiers appear in the children field of data unit 120 in that order, indicating that B1 precedes B2. Conversely, the identifier of data unit 120 is A, and this identifier appears in the parent field of each of data units 122 and 124. On the other hand, the parent field of data unit 120 contains the value NIL, indicating that it has no parent, but is the outermost textual type unit. The children fields of data units 122 and 124 contain the identifiers of lower level data units that are not shown.

The types of data units 120, 122 and 124, indicated in their textual type fields, are sentence, word, and comma-interpolation, respectively. Among the modifications that would be consistent with English grammar would be moving B2 in front of B1; moving B1 behind B2; and moving B1 into B2. As can be seen from FIG. 5, each of these modifications can be made by changing the values in the parent and children fields of the data units. The first two modifications, each of which merely changes the order of the links between A and its children, can be made by rearranging the identifiers in the children field of data unit 120, without changing any of the link. The third modification, moving B1 into B2, requires that one link be replaced by another link. To do so, B1 is deleted from the children field of data unit 120 and A is deleted from the parent field of data unit 122. Then, B1 is added to the children field of data unit 124 and B2 is inserted in the parent field of data unit 122. These modifications can thus be made by modifying values in the linked data units that are independent of the words in the text. Those values, together with other values that are also independent of the words in the text, such as the values in the textual type fields, define the distribution and dependencies of punctuational features without reference to lexical content. Therefore, the data structure shown in FIG. 5 has an autonomous punctuational structure.

Figure 6:
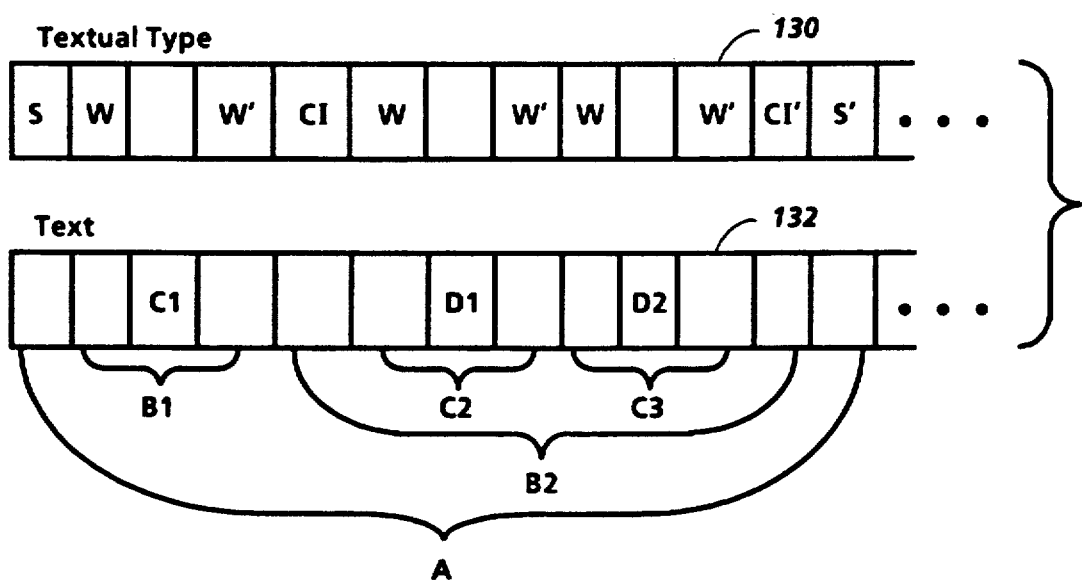
FIG. 6 is a schematic representation of data sequences in another implementation of an autonomous punctuational data structure according to the invention.

FIG. 6 shows another implementation of the nesting model that has an autonomous punctuational structure, this time with two parallel data sequences 130 and 132. Data sequence 130 includes delimiters indicating the textual types of textual type units in data sequence 132. The beginning of a textual type unit in data sequence 132 is indicated in data sequence 130 by its textual type, such as sentence (S), word (W), or comma-interpolation (CI). The ending of a textual type unit is similarly indicated by its textual type with an apostrophe, such as S', W' or CI'.

The textual type units in FIG. 6 correspond to those in FIG. 5, so that sentence A includes word B1 and comma-interpolation B2; word B1 includes the text segment C1; and comma-interpolation B2 includes words C2 and C3, which in turn include text segments D1 and D2 respectively. Due to the sequential nature of the data, modifications may be more difficult to make than with the data units of FIG. 5, but the punctuational features can be modified. For example, the order of B1 and B2 can be changed by moving the data corresponding to B1 in each data sequence behind the data corresponding to B2. Similarly, B1 could be moved into B2 by moving the corresponding data inside the delimiters of B2. Data sequences 130 and 132 could also be combined into a single data sequence if appropriate. In any of these cases, the structure data defines the distribution and dependencies of punctuational features without reference to lexical content, so that FIG. 6 also shows an autonomous punctuational data structure.

The nesting model could be implemented in other ways in addition to those illustrated in FIGS. 5 and 6. Furthermore, other models of autonomous punctuational structure could be developed. In general, therefore, the term "autonomous punctuational structure" encompasses all implementations of any model of punctuational structure in which the structure data defines the distribution and dependencies of punctuational features without reference to lexical content. The structure data can function as a link as in FIG. 5, as a delimiter as in FIG. 6, or in any other appropriate manner.

4. An Autonomous Punctuational Grammar

One way to find an explicit autonomous punctuational structure for a text is to use an autonomous punctuational grammar to analyze the text into units that can be related to each other by such a structure. Bearing in mind the nesting model of autonomous punctuational structure, an autonomous punctuational grammar could include textual type rules that indicate, for each textual type, acceptable patterns of textual types that can be nested within that textual type. Therefore, one way to construct an autonomous punctuational grammar is to identify a set of textual types and, for each textual type in the set, to identify patterns of textual types that can be nested within it, and in what order the subordinate textual types must appear, if the order matters.

Since the objective of the autonomous punctuational grammar is to obtain punctuational structure, the set of textual types is preferably selected to cover the distribution and dependencies of most of the common punctuational features in a specific natural language. In other words, the set of textual types should permit a set of textual type rules that can be used to transform in either direction between the text with presentation codes and a data structure with an autonomous punctuational structure that accounts for most punctuational features. In English, for example, a useful set of basic textual types includes document (doc), paragraph (para), sentence (sent), clause, phrase, and word. In addition, paragraphs, sentences and clauses can be in parentheses (paraparen, sentparen, or clauseparen) or in quotation marks (paraquote, sentquote, or clausequote). In some cases a string of characters, rather than being a word, can be handled as an unstructured string (unstructured). (The unstructured textual type allows for inclusion of flat text; the internal structure of such text can be ignored.) Additional textual types, such as comma-interpolation, referred to above, can be added to cover more fully the distribution and dependencies of punctuational features such as colons, semicolons, commas, dashes, and so forth; ideally, all acceptable punctuational features could be covered, providing a complete autonomous punctuational grammar; but the basic textual types set forth above cover the most common punctuational features of English text.

An example of a set of textual type rules based on these textual types is as follows:

| | |
|---|---|
| 1. doc::= | [(para\|paraquote\|unstructured) (para\|paraparen\|paraquote\|unstructured)*]\| NIL |
| 2. para::= | [(sent\|sentquote)(sent\|sentparen\|sentquote)*]\| NIL |
| 3. sent::= | clause* |
| 4. clause::= | phrase* |
| 5. phrase::= | [(word\|clausequote\|sentquote) (word\|clauseparen\|clausequote\|sentquote)*]\| NIL |
| 6. word::= | char* |
| 7. unstructured::= | char* |
| 8. paraparen::= | (para\|paraquote)* |
| 9. sentparen::= | (sent\|sentquote)* |
| 10. clauseparen::= | clause* |
| 11. paraquote::= | [(para\|paraquote)(para\|paraparen\| paraquote)*]\| NIL |
| 12. sentquote::= | [(sent\|sentquote)(sent\|sentparen\|sentquote)*]\| NIL |
| 13. clausequote::= | clause* |

In these rules, "*" means that whatever textual type precedes can be repeated any number of times within the defined textual type; "(X|Y)" means that a textual type unit is acceptable in a given position if it is an X or a Y, so that the vertical slash means "or"; "char" means a character of any type except those that indicate punctuational features; juxtaposition of two terms means that the first occurs before the second within an occurrence of the defined textual type; and "NIL" means that the defined textual type can match the empty string. For example, rule 3 means that a sentence can include any number of clauses. Similarly, rule 9 means that a sentence in parentheses can include any number of occurrences of sentences or sentences in quotes. Rule 1 implicitly means that a document cannot begin with a paragraph in parentheses, no matter what follows, because a document is defined as an empty string or as a sequence of two terms, the first being a paragraph, a paragraph in quotes, or an unstructured string of characters and the second being a paragraph, a paragraph in parentheses, a paragraph in quotes, or an unstructured string.

Although the above set of rules can be applied to English, it is not the only set of rules that could be applied to English. Furthermore, it includes a number of rules that apply to English but that are not explicitly taught or listed in standard words on English punctuation. For example, rules 1, 2 and 5 implicitly prohibit the appearance of a parenthetical paragraph, sentence, or clause at the beginning of a document, paragraph, or phrase, respectively. In general, this or other such sets of rules must be obtained empirically, by examining the actual patterns of punctuation followed in a natural language. Although such rules are a matter of tacit knowledge among competent writers of a language, they are not obvious nor accessible to conscious reflection, and are not taught in standard handbooks or other literature or in the classroom. Such rules prove particularly useful when stated in a systematic, rigorous and categorical way, as above.

Most of the rules set forth above apply to textual types below the level of a paragraph, such as sentences, clauses, phrases and words. These intra-paragraph textual types are of particular interest because they can be used to define the distribution and dependencies of most punctuational features. Furthermore, it has been discovered that, in general, intra-paragraph textual types like these are independent of genre, applying to prose, poetry, and other types of English text. To further adapt such a set of textual types to a specific genre, genre-specific types can be added such as lines, as in poetry; bullet items; block quotes; and so forth. It has further been discovered that these or similar intra-paragraph textual types can be used to obtain appropriate grammars of textual types for different punctuation styles within English, and for natural languages other than English.

When an autonomous punctuational grammar has been obtained, it can be used to process natural language text in a wide variety of ways. We turn now to examine several uses of such a grammar that are applicable in editing.

5. Using an Autonomous Punctuational Grammar in Editing

An autonomous punctuational grammar can be used by finding a rule applicable to a given textual type unit and then applying that rule to the textual type unit. An editor that makes use of an autonomous punctuational grammar therefore includes one or more subroutines that retrieve and apply a rule to a textual type unit. These subroutines are accessed, however, through an editing environment that also provides an appropriate user interface.

A. Editing Environment.

Figure 7:
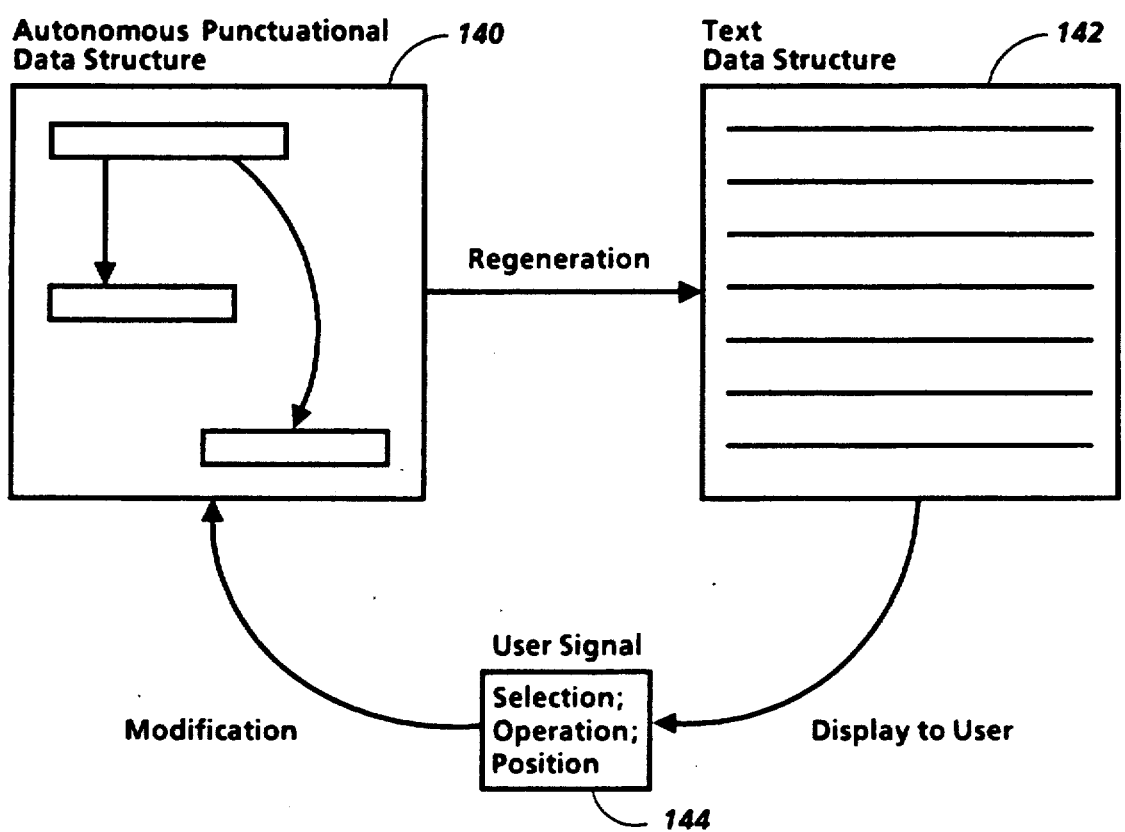
FIG. 7 is a schematic flow diagram showing operations and data structures during text editing according to the invention.
Figure 8:
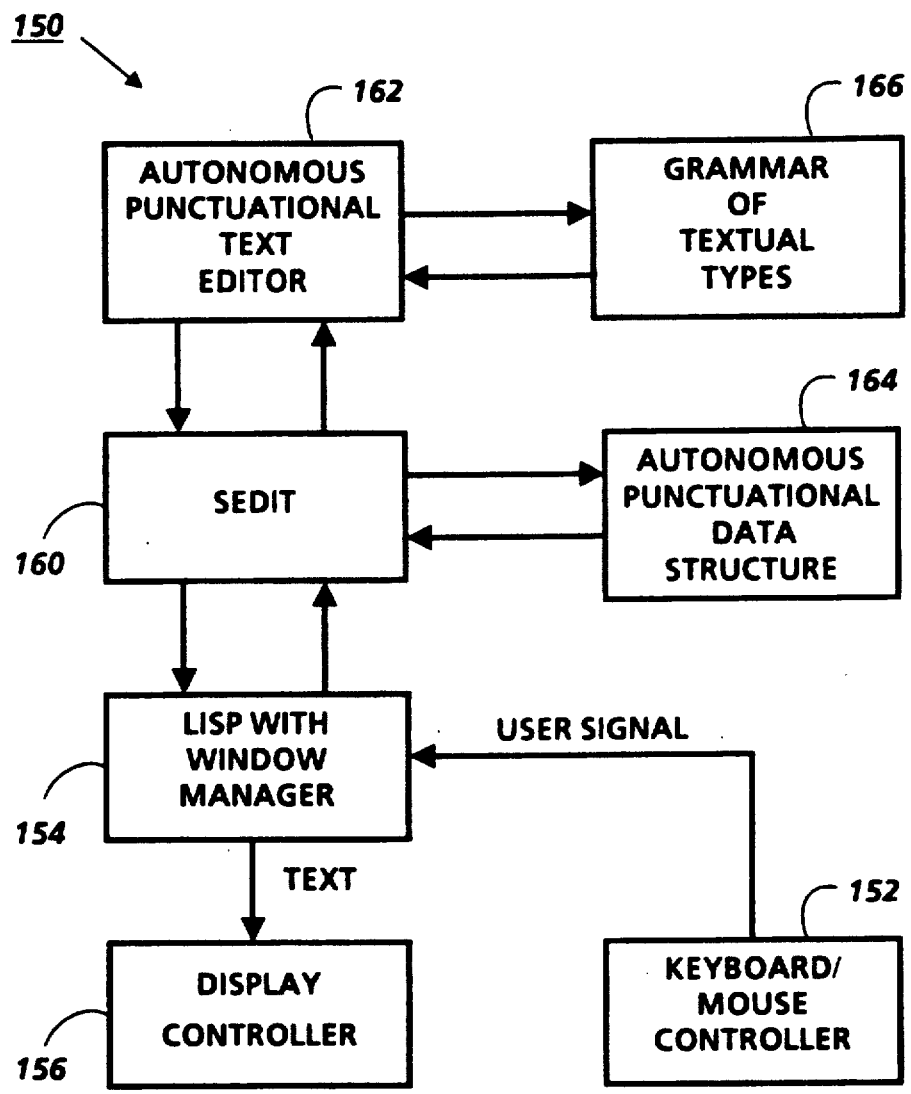
FIG. 8 is a schematic block diagram showing relations between software and data structures in an implementation of the invention.
Figure 9:
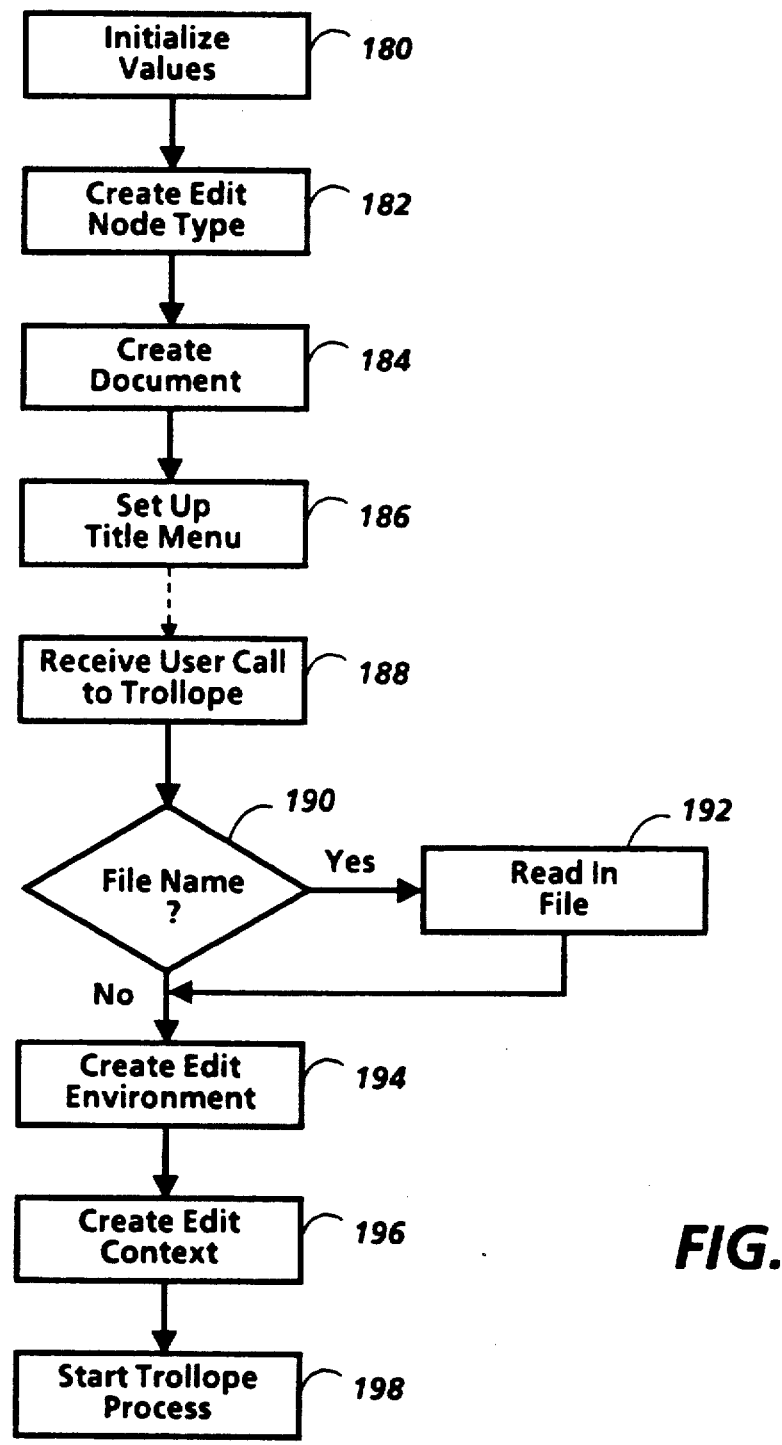
FIG. 9 is a flow chart showing how editing is set up on the implementation of FIG. 8.

An editing environment using an autonomous punctuational grammar could be implemented in many ways. FIG. 7 shows general operations of an exemplary editing environment. FIG. 8 shows in more detail how the operations of FIG. 7 can be provided using a preexisting structure editor, SEdit. FIG. 9 shows steps prior to editing with the arrangement of FIG. 8.

Three data structures play a role in the editing environment of FIG. 7. Autonomous punctuational data structure 140 represents a natural language text and has structure data indicating an autonomous punctuational structure as described above. Text data structure 142 is a sequence of codes including character codes, punctuation mark codes, space codes, carriage-control codes, and other codes required to present the text represented by autonomous punctuational data structure 140. User signal 144 is a set of signals indicating an editing operation to be performed on the text, such as selection signals, operation signals, and position signals.

FIG. 7 also shows operations linking these data structures. The editing operation requested by user signal 144 can be performed by modifying autonomous punctuational data structure 140. Then, a modified version of text data structure 142 can be regenerated from autonomous punctuational data structure 140. A display is provided to the user in the conventional manner based on this text data structure 142, causing the user to provide another user signal 144.

One way to implement the invention would be to write software to perform all the functions shown in FIG. 7. Preexisting software can be used in performing those functions, however, so that the invention can also be implemented using some of the preexisting software. For example, FIG. 8 shows an implementation using SEdit, a structure editor for the Lisp programming language that is available commercially from Envos Corporation. SEdit is especially useful because it provides a data structure that can be readily modified to implement the features described above.

System 150 in FIG. 8 includes keyboard/mouse controller 152, a conventional controller that provides user signals such as those described above in relation to FIG. 7. These signals are received by conventional Lisp software 154, which includes a window manager that determines to which of the displayed windows each user signal should be directed. Lisp software 154 also includes software for handling the signals directed to each window and, when appropriate, for sending text such as that described above in relation to FIG. 7 or other data to display controller 156 for display in the appropriate window.

System 150 also includes SEdit software 160, a subsystem of software that is called by Lisp software 154 when user signals are directed to an SEdit window. For example, the user may first provide signals requesting that an SEdit window be opened, in which case Lisp software 154 calls SEdit software 160 to provide the necessary parameters for the SEdit window. Once the SEdit window is opened and displayed, when the user provides a mouse click within that window, Lisp software 154 calls SEdit software 160 to handle that mouse click. Similarly, when the active cursor is in the SEdit window and the user provides keyboard strokes, Lisp software 154 calls Sedit software 160 to handle those strokes.

If the user requests an SEdit window for autonomous punctuational text editing, SEdit similarly calls autonomous punctuational text editor 162 to provide the necessary parameters for editing and to handle user signals relating to editing within that window. Editor 162 may respond with a request that SEdit software 160 access autonomous punctuational data structure 164 to modify it or to retrieve data relating to an editing operation. Editor 162 may also request that SEdit software 160 change what is displayed in the SEdit window, in which case SEdit software 160 in turn calls Lisp software 154.

For example, if the user makes a left mouse click, meaning "select" or "point," within the SEdit window, keyboard/mouse controller 152 provides a corresponding user signal to Lisp software 154, which provides an indication of the left mouse click and the current x,y position of the pointer to SEdit software 160. SEdit software 160 can then perform its conventional operations to identify the node within data structure 164 corresponding to the x,y position and to determine the position within that node's display area of the pointer. SEdit 160 can then call editor 162 with that data, and editor 162 can process the data and respond by indicating the selected part of the text within data structure 164 or the insertion point position within the text. SEdit can then use this data to include underlining of the selection or a flashing caret indicating the position in the text regenerated from data structure 164. Lisp software 154 then provides the regenerated text to display controller 156 for display. If a selection has been made, an operation requested by the user signals can be performed on that selection; if an insertion point has been indicated, a copy of the selection or characters from subsequent keystrokes can be inserted at that point.

FIG. 8 also shows grammar of textual types 166, the set of rules that editor 162 follows in operating on data structure 164. SEdit software 160 can also provide a user interface to grammar 166 so that the user can modify the rules that editor 162 follows. This may be useful, for example, to set up editor 162 to handle a different set of characters, a different language, or a different dialect within a language.

Microfiche appendix A is Lisp code entitled "Trollope" that implements autonomous punctuational text editor 162 and grammar of textual types 166 in FIG. 8 and that is executable on a Xerox 1186 artificial intelligence workstation running SEdit. Microfiche appendix B is a version of SEdit that supports the Lisp code in microfiche appendix A, and is expressed as binary code converted to hexadecimal form. FIG. 9 shows steps taken by the code in microfiche appendix A prior to editing. As will be seen, many of these steps establish links through which editor 162 calls SEdit 160 or SEdit 160 calls editor 162.

The steps in FIG. 9 begin with initialization of values, in box 180. This is performed by the function Init in microfiche appendix A, which also calls another function, InitRendering. InitRendering initializes some values that extend the SEdit list of character names. InitRendering also sets up a default specfication for use during regeneration in rendering a node in autonomous punctuational text data structure 164 into data for inclusion in a sequence of text to be presented.

The step in box 182 is also part of Init, performed by calling the function CreateEditNodeType to set a number of SEdit parameters in EDIT-NODE-TYPE that define a node of autonomous punctuational text data structure 164.

The step in box 184 similarly initializes a document to be edited by calling the function CreateDoc to set up grammar of textual types 166 for editing that document. In addition to the grammar itself, an example of which is set forth above and as DefaultGrammar in microfiche appendix A, the rules govering editing include a set of rendering rules used during regeneration of text, an example of which is set forth as DefaultRendering in microfiche appendix A, and a set of operation rules governing modification of autonomous punctuational data structure 164, an example of which is set forth as DefaultOperations in microfiche appendix A. As shown in microfiche appendix A, CreateDoc in turn calls InternalizeGrammar, InternalizeRendering, and InternalizeOps, which convert the rules and the grammar from a form in which they can easily be edited by a user into an internal form in which they can be used more readily by the software.

The step in box 186 completes initialization by calling the function TitleMenuFn to set up a title bar menu for the special window used for editing, hereinafter called the "Trollope window." This menu can include a number of items, such as items for requesting that a Trollope document be saved or that the user be permitted to edit the grammar, rendering, or operations rules. As shown in TitleMenuFn, selection of an item in this menu leads to a call to another function, such as TrollopePut, EditRules, or ChangeFont.

At this point, the system is ready to begin editing. Init sets up a window and presents TrollopeLogoBitmap indicating availability of the Trollope editor. The system then waits for a user signal requesting Trollope editing, as indicated by the dashed line between boxes 186 and 188. The user may provide such a signal by calling the Lisp function Trollope. The request may also include a file name for a file containing a Trollope document to be edited. The steps in boxes 180–186 are performed when Trollope is loaded into the system. After that, they need not be repeated each time the user invokes Trollope to open a new Trollope window—only the steps beginning with box 188 are necessary for a new Trollope window.

Upon receiving a user call in box 188, the Trollope function tests in box 190 whether the user request included a file name. If so, Trollope calls TrollopeRead to read in the file, in box 192. Otherwise, the system uses default values in subsequent steps in FIG. 9.

Trollope then calls TrollopeStart to perform the remaining steps in FIG. 9, with parameters from the file read in or with the default values. TrollopeStart in turn calls CreateEditEnv to set up an edit environment for Trollope by setting a number of SEdit parameters in EDIT-ENV, in box 194. TrollopeStart then calls CreateContext to set up a context for the requested Trollope editing session by setting a number of SEdit parameters in EDIT-CONTEXT, in box 196.

Finally, in box 198, TrollopeStart set up an instance of the SEdit process SEDIT1. SEDIT1 sets up the Trollope window and handles subsequent inputs from the user directed to that window.

At this point the user can edit in the Trollope window. The editing operations requested by the user result in modifications of autonomous punctuational data structure 164. If a file was not read in box 192, data structure 164 has a simple structure that serves as a seed for the development of a document. This structure starts with a single node, including fields like those shown in FIG. 5, and the document can be developed by adding additional nodes with the same fields. Some of the fields are used by SEdit, such as the parent field; the children field; a SET-POINT field, indicating a function to go from a mouse click to the area within the node within which the click occurred; and so forth. Other fields are not used by SEdit, such as the textual type field; features fields for features of the node that relate to its textual type; a rendering rule field indicating the rendering rule for converting the node while regenerating the text sequence; text included in the node; and other information that does not relate to SEdit, but only to Trollope.

We turn now to examine in greater detail how user signals requesting modifications in autonomous punctuational data structure 164 are handled in accordance with an autonomous punctuational grammar.

B. Modifying an Autonomous Punctuational Data Structure.

Figure 10:
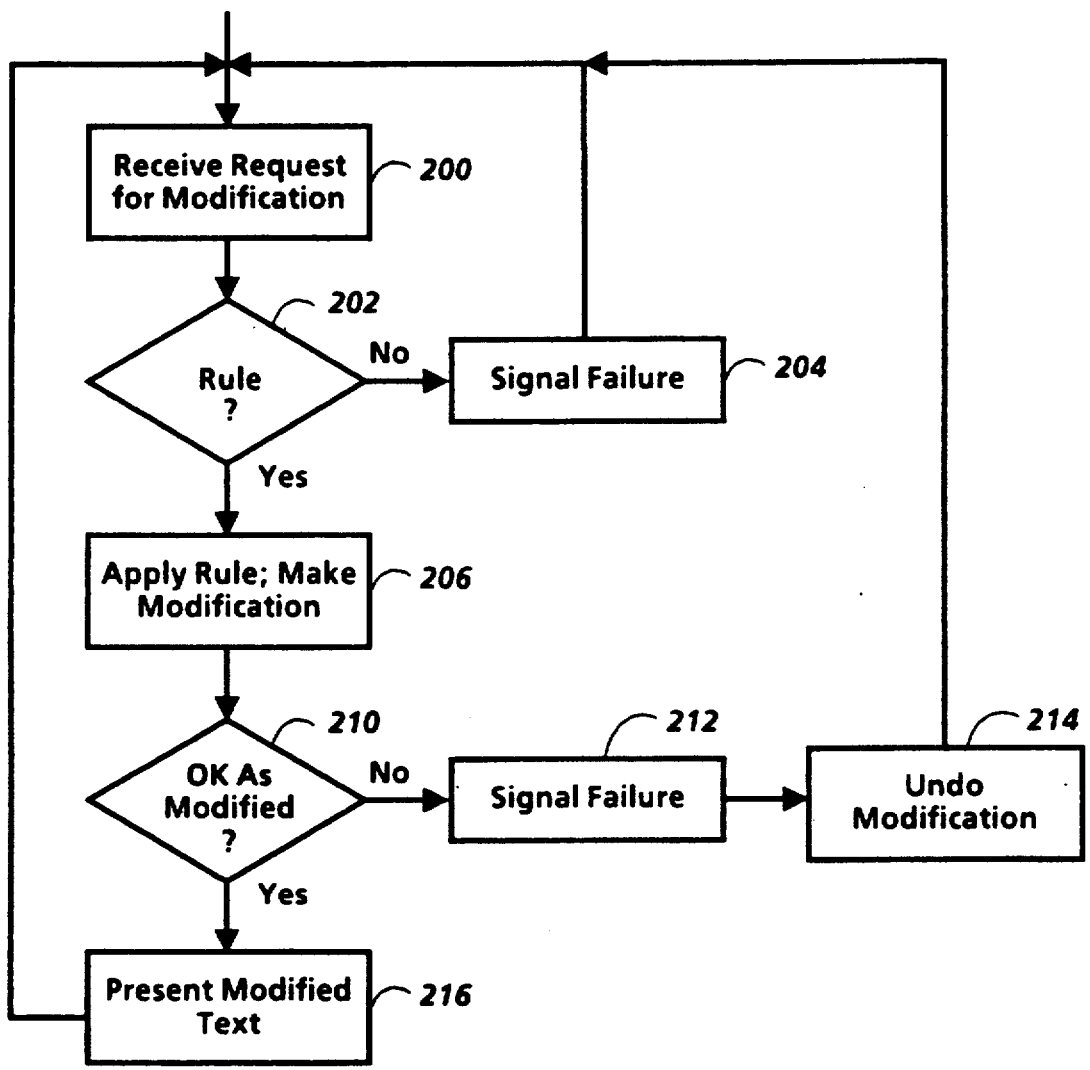
FIG. 10 is a flow chart showing general steps of modifying an autonomous punctuational data structure according to the invention.

FIG. 10 shows general steps in modifying data structure 164, including steps to maintain its autonomous punctuational structure. A modification begins in box 200 when the user provides a signal requesting an operation. The step in box 202 searches for an operation rule to perform the requested operation. If none is found, a failure occurs, and may be signalled to the user in box 204 before returning to receive another request in box 200. If a rule is found, the step in box 206 applies the rule, which may include modifying data structure 164. Then, the step in box 210 determines whether data structure 164 still satisfies the autonomous punctuational grammar 166. If not, a failure occurs, and may be signalled to the user in box 212; then, in box 214, the modification that was made in box 206 is undone, to return data structure 164 to its previous state before returning to receive another request in box 200. But if data structure 164 still satisfies grammar 166, a modified text for presentation is provided based on the modified data structure, and this modified text is presented to the user in box 216 before returning to receive another request in box 200.

The code in microfiche appendix A includes functions that perform the general steps of FIG. 10, because SEdit calls Trollope functions to modify data structure 164. In general, SEdit calls Trollope functions to assist it in handling mouse clicks requesting a selection or indicating an input point within the Trollope window and in handling character codes when the current selection or input point is in the Trollope window. Among the SEdit parameters set up in creating the edit node type in box 182 and the edit environment in box 196 are handles for calling a number of Trollope functions, including SetPoint, SetSelection, SelectSegment, InterpretChar, Insert, Delete, and UndoRedoTable, all in microfiche appendix A. In particular, InterpretChar is called whenever a character is typed to an insertion point within the Trollope window, and this is the signal from the user that can result in a modification of data structure 164 in accordance with FIG. 10.

Figure 11:
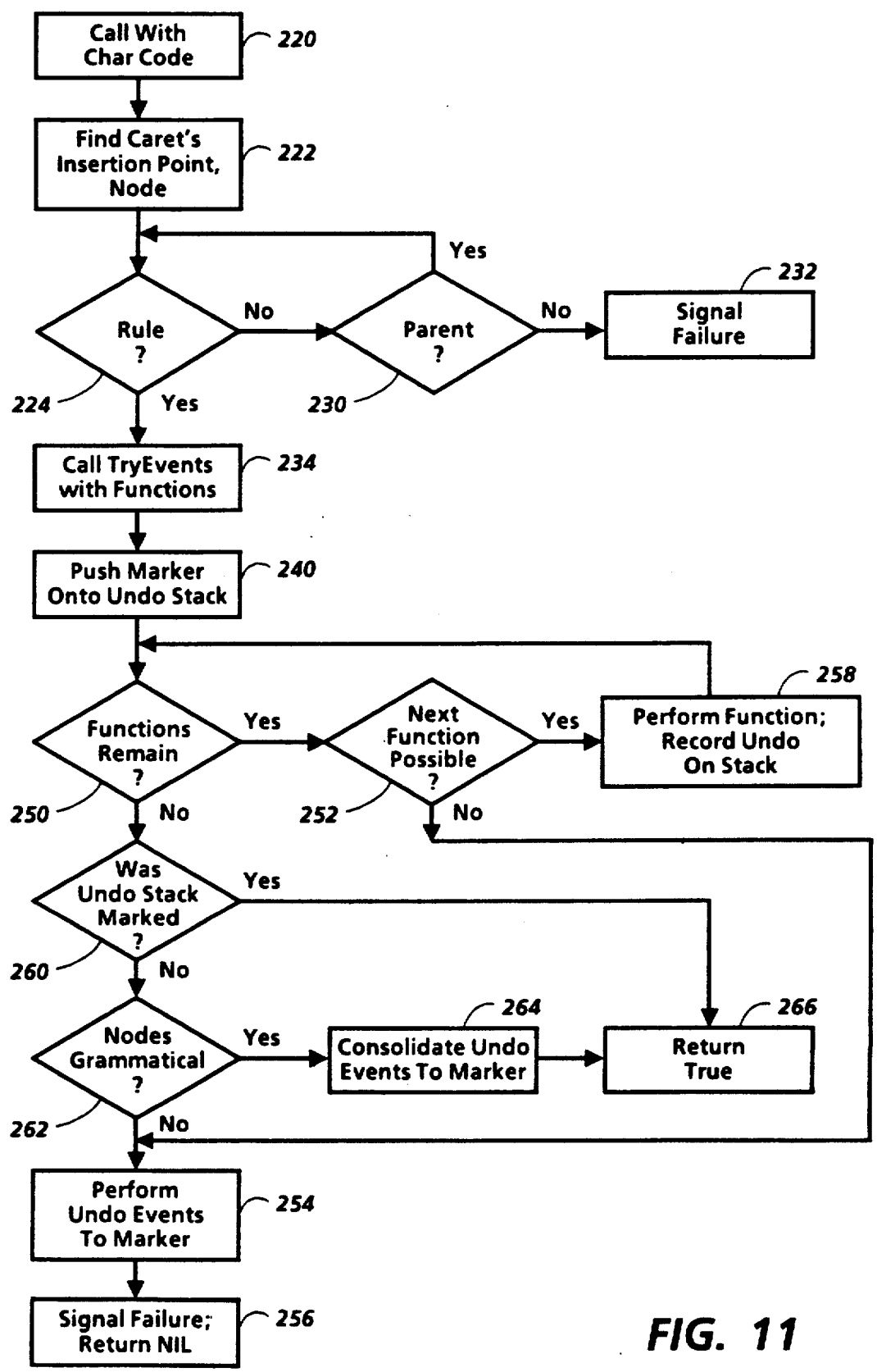
FIG. 11 is a flow chart showing in more detail an implementation of the technique of FIG. 10.

FIG. 11 shows steps followed when InterpretChar is called, especially those steps relating to grammer 166 and the related operation rules. In general, the steps in FIG. 11 correspond to the steps in FIG. 10, but with a number of additional details.

The step in box 220 receives a call to InterpretChar from SEdit with a character code indicating the requested operation. In response, InterpretChar finds the current caret location, and determines its insertion point and insertion node, if any, in box 222. Then InterpretChar calls InterpretCommand, which in turn calls OperationSpec.

OperationSpec determines whether the character code corresponds to any of the operation rules. If OperationSpec determines that the current caret location has a node, it first calls the macro OperationRule with the textual type and features of the node. The features are values that can indicate level of nesting within quotations, for example. OperationRule in turn calls FindRule to go through the operation rules looking for a rule for that textual type that has matching features. Upon finding such a rule, FindRule retrieves the portion of the rule that indicates the functions to be performed for specified character codes and data for the functions. CharTableGet then accesses that part with the character code received to obtain the functions and data for that character code.

If OperationSpec does not obtain an operation from the above-described calls, it again calls OperationRule, but this time asking for a more general rule, applicable to all textual types and the features of the node. If, in response to OperationRule, FindRule finds such a rule, it retrieves the portions with operations, and CharTableGet accesses that part to obtain the functions and data for the specific character code.

If, on the other hand, OperationSpec determines that the current caret location does not have a node, it calls OperationRule asking for a rule applicable to all textual types and with no features on. If, in response to OperationRule, FindRule finds such a rule, it retrieves the portion with operations, and CharTableGet accesses that part to obtain the functions and data for the character code, as above.

InterpretCommand branches based on whether OperationSpec successfully returns one or more functions, in box 224. If not, it tests in box 230 whether the node has a parent node. If so, it calls InterpretCommand recursively to search for an operation rule based on the parent node. But if not, InterpretCommand calls Flash to signal failure in box 232.

If InterpretCommand receives one or more functions from OperationSpec, it calls TryEvents to handle those functions, in box 234. Each function could be any several Trollope functions, including OpenNode, SplitNode, MergeSelection, DeleteSelection, ChangeNodeFeatures, and BackSpace. In general, each of these functions can depend on the type of the current insertion point or selection, as well as on the node and on data obtained from the operation rule; the functions are chosen by the mechanism presented above. TryEvents attempts to excute the functions as shown in the subsequent steps in FIG. 11.

TryEvents uses an SEdit stack named UNDO-LIST to store inverse functions or undo events that can be executed to undo the effect of functions executed in response to TryEvents. The stack is marked with a value indicating the start of a new series of undo events, in box 240.

The iterative loop that begins with the test in box 250 attempts to execute the functions received with the call from OperationSpec in box 234, handling the functions in the sequence in which they were received. The step in box 252 test whether the next function can be performed. This typically invovles checking certain parameters to make sure they are consistent with the function. If not, the system performs the undo events from the undo stack up to the marker, in box 254, and signals failure, in box 256, as discussed further below. But if the function can be performed, the step in box 258 performs it and also loads one or more appropriate undo events onto the stack.

The Trollope functions listed above typically call one or more functions that can be undone, such as DoInsert, DoReplace, DoSplit, DoMerge, DoDelete, or DoChangeFeatures, Intermediate functions such as Delete and Prune may also be called that lead to one of these functions that can be undone. Each of the functions that can be undone loads an undo event onto the stack in addition to calling a basic operation such as InsertChildren, DeleteChildren, ReplaceChildren, Spilt, Merge, and ChangeFeatures to perform the function itself. If the basic operation results in a data structure that does not conform with grammer 166, the undo event can later be executed to restore data structure 164 to its previous state. Alternatively, if the operation completes successfully, and if the user upon reconsideration decides that the operation was undesirable, the user could request to undo operation, such as by pressing a designed "undo" key; in response, the undo events from the undo stack could be performed to undo the previous operation. Each basic operation also calls NoteChange to store data indicating the highest node changed by that operation.

When all of the functions have been performed, the test in box 260 determines whether, at the time TryEvents was called in box 234, the stack had been marked to indicate the beginning of a series of undo events. If not, TryEvents checks its results so far by calling the function OK?, another Trollope function that checks nodes of the data structure to make sure they still conform with grammer 166, in box 262. The steps taken by OK? to check nodes are described in greater detail below. If the nodes conform to grammer 166, the step in box 264 consolidates the undo events since the most recent stack marker into a single event by calling the SEdit function COLLECT-UNDO-BLOCK. At this point, the step in box 266 returns the value T, or True, indicating successful completion of the functions received with the call in box 234.

If OK? determines that the results do not conform to grammar 166, the step in box 254 performs the undo events on the stack, beginning with the one most recently pushed onto the stack and continuing until the most recent stack marker is found. When the marker is found, the step in box 256 signals failure by calling Flash and returns the value NIL indicating an unsuccessful attempt to perform the functions received with the call in box 234.

Figure 12:
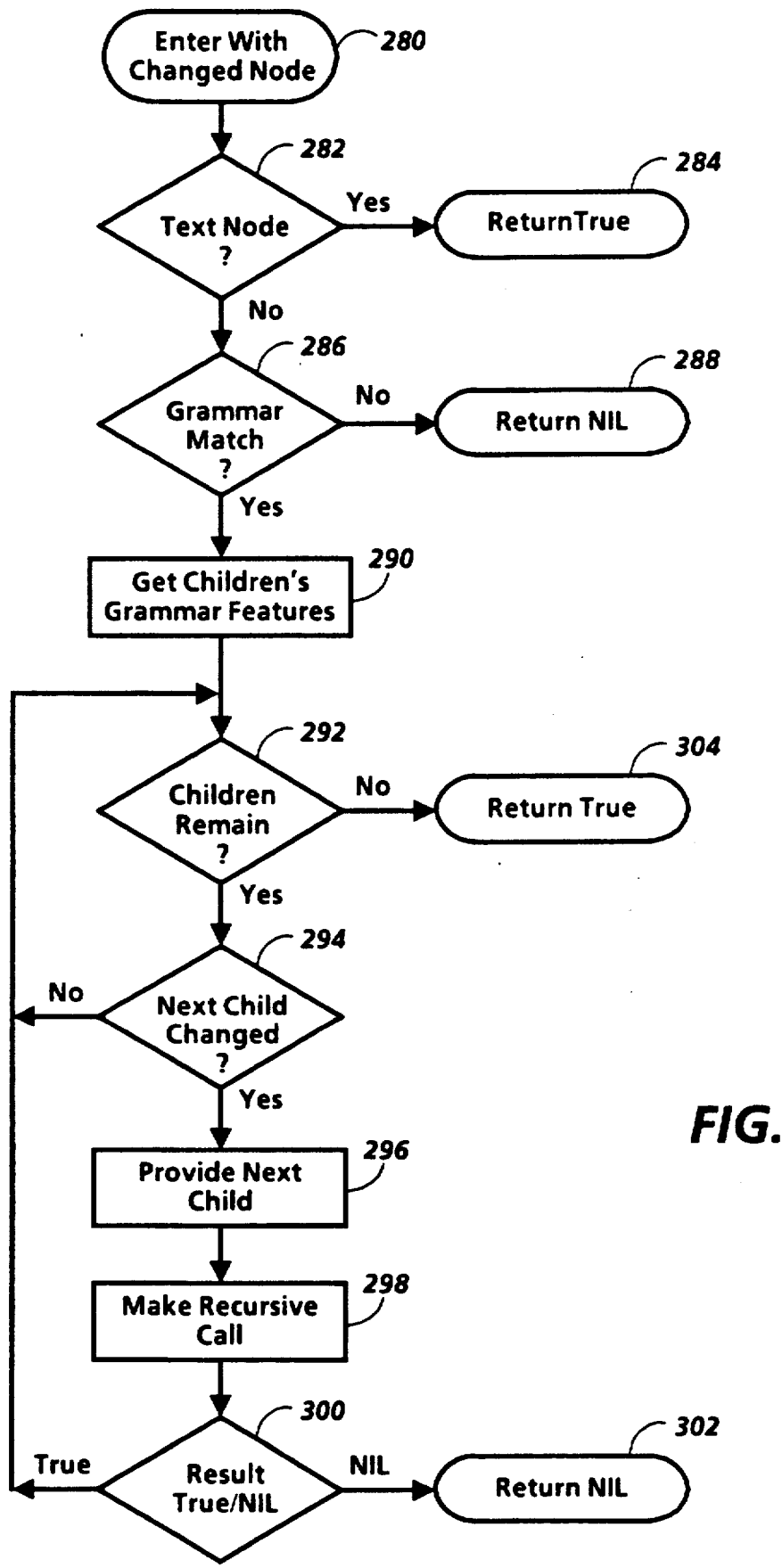
FIG. 12 is a flow chart showing steps of grammar matching to check results in FIG. 11.

FIG. 12 shows steps taken by OK? in recursively checking whether a node and its children conforms to grammer 166. A call to OK? includes a changed node to be checked, as shown in box 280. If the call comes from another procedure, such as TryEvents, the call to OK? can include the highest changed node stored by NoteChange. If the call is a recursive call from OK?, it includes one of the descendent nodes of the changed node received from the other procedure that initially called OK?.

OK? callsTextNode? to check whether the node with which it was called is a text-bearing leaf node with a non-empty character string, in box 282. If so, there is no need to check further, since such a node always satisfies grammer 166 and since such a node has no children nodes depending from it. Therefore, the step in box 248 returns the value True, indicating that the results so far are okay. If this value is returned to TryEvents, the steps in FIG. 11 resume with the step in box 264.

If the node is not a text-bearing leaf node, OK? continues in box 286 by calling the function Match with the children of the node and the grammatical rule applicable to the node, provided as a pattern. The rules could alternatively be provided using minimal deterministic finite state machines computed when the grammer is internalized. The function Match in microfiche appendix A, however, employs a stack-based backtracking to match nodes against a pattern which is a regular expression over an alphabet of atomic type names.

As implemented in microfiche appendix A, Match starts with two lists, one the list of children nodes and the other a list of elements of the pattern. Whenever Match completes handling a node or a pattern element, it goes to the next node or to the next pattern element and begins again with the two lists.

Whenever Match begins with two lists, whether at the start or after handling a node or pattern element, it first tests whether any nodes are left on the list of children nodes. If not, it returns the value True indicating a match, only if the list of remaining pattern elements can match the empty string, determined by calling the function PossiblyEmpty?; if the list of nodes is empty and the remaining pattern elements cannot match the empty string, Match returns NIL, indicating failure to match.

If nodes remain, Match next texts whether any patterns are left on the list of pattern elements. If not, Match takes a list of pattern elements from a stack of patterns that have previously been deferred. If no patterns have been deferred, Match returns NIL, indicating failure.

When neither the pattern list nor the node list is empty, Match proceeds by attempting to match the pattern list to the node list. If the next pattern element is starred, Match calls itself recursively (using the deferred pattern stack) to attempt to match the starred pattern sequence zero or more times with successive portions of the node sequence. Nodes are removed from the node list as they are matched with a starred pattern element, but each starred pattern element remains on the pattern list until it fails to match. If the next pattern element is an "or", Match calls itself recursively (again using the deferred pattern stack), attempting to match any of the "or" alternatives against the nodes on the node list, returning NIL if it fails to match any of the alternatives with nodes, but otherwise removing both the "or" pattern and the matched nodes from their respective list. Finally, if the next pattern element is a textual type name, Match returns NIL if the pattern does not equal the node's type, but otherwise proceeds to match the remaining nodes and patterns. In this way, Match goes through the list of nodes and the list of pattern elements, finally returning a value that indicates whether they can be matched.

If Match indicates that there is not a match, the step in box 288 returns the value NIL, indicating the structure is unacceptable. If this value is returned to Try Events, the steps to FIG. 11 resume with the step in box 254. But even if the current node conforms to grammer 166, so that there is a match, changes may have been made in its children nodes, so that it is necessary to check the children.

In box 290, OK? calls DistributeGramFeatures to obtain the grammer features that apply to the children of the current node. Then, the step in box 292 begins an iterative loop that handles each child of the current node in turn. The test in box 294 determines whether the next child was changed, and, if not, OK? returns to the test of box 292. If the next child was changed, OK? provides the changed child, in box 296, and makes a recursive call in box 298, so that the recursive call enters the steps in FIG. 12 at box 280 with the changed child. The calling OK? then branches in box 300 based on the result returned by the recursively called OK? returning the value NIL in box 302 if it receives NIL. As noted above, if this value is returned to TryEvents, the steps FIG. 11 resume with box 254. If it receives the value True, it returns to the test in box 292. If all the children have been handled and have been found to be grammatical, the step in box 304 returns the value True. As noted above, if this value is returned to TryEvents, the steps of FIG. 11 resume at box 264.

When the function of FIG. 11 is completed, data structure 164 may have been modified in response to the character code from the user. We turn now to examine how the changed data structure may be converted to a sequence for display to the user in accordance with an autonomous punctuational grammer.

C. Regenerating Text from Autonomous Punctuational Data Structure.

Figure 13:
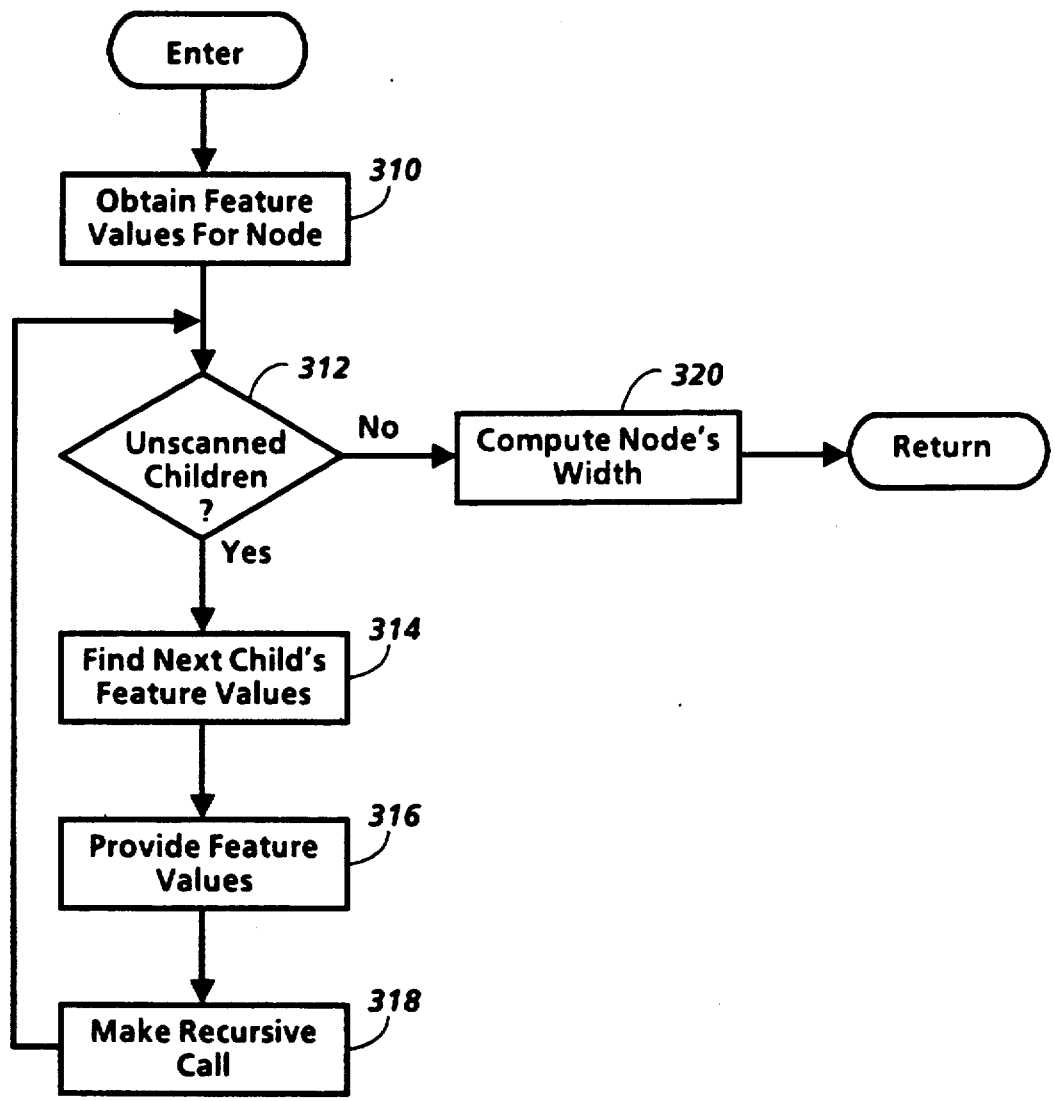
FIG. 13 is a flow chart showing general steps of propagating information through an autonomous punctuational data structure in preparation for regenerating a text sequence according to the invention.
Figure 14:
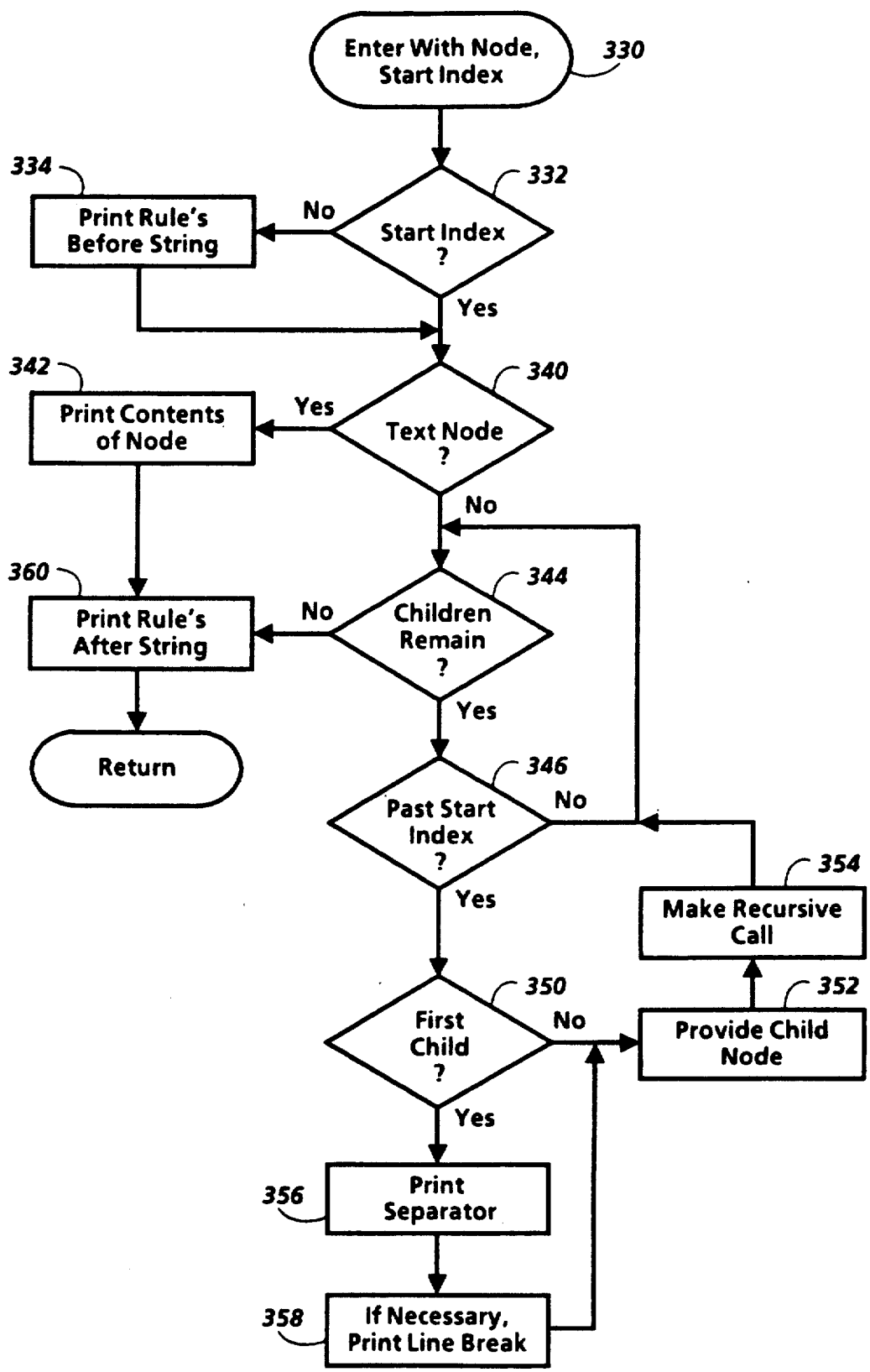
FIG. 14 is a flow chart showing general steps of regenerating a text sequence from an autonomous punctuational data structure according to the invention.

As a part of its conventional operation, SEdit regenerates from data structure 164 a sequence of text for display. To do so, SEdit calls several Trollope functions in microfiche appendix A in relation to each node in data structure 164. FIG. 13 shows general steps by which information can be propagated through an autonomous punctuational data structure in preparation for regeneration. FIG. 14 shows steps by which regeneration can then be performed.

A sequence like that in FIG. 13 can be used to propagate information downward as well as upward within data structure 164. The information propagated downward may, for example, be one or more features values indicating level of nesting within quotation marks, to facilitate proper alternation of single and double quotation marks. The information propagated upward may, for example, indicate width, to facilitate subsequent insertion of line breaks.

The sequence of FIG. 13 begins by obtaining the current node's feature values, in box 310. In the implementation of microfiche appendix A, step can be initiated by a call to the Trollope function InternalRender by SEdit, via the SEdit function ASSIGN-FORMAT. In general, SEdit will call ASSIGN-FORMAT in handling its function SET-FORMAT, which also requires a scan of data structure 164. Therefore, these format functions are a useful vehicle for feature value propagation. InternalRender in turn calls the Trollope function RenderingRule to retrieve the node's rendering rule, a rule that governs how it will be rendered during regeneration of the text sequence; if it is no rendering rule, RenderingRule provides the default rendering rules, an example of which appears in microfiche appendix A as DefaultRendering. Alternatively, if the sequence of FIG. 13 is called recursively, appropriate feature values can be provided in the recursive call, as discussed below.

The test in box 312 then determines whether the current node has any children nodes to which the feature values have not been propagated. InternalRender calls the Trollope function PropagateRendFeatures to perform the test in box 312 and the following iterative loop.

For each child node, the step in box 314 obtains its feature values. To do this, PropagateRendFeatures finds a propagation rule for the next child based on whether the child is an only, first last, or middle child. For an only child, all forms of propagation apply— down-left, down and down-right; for a first child of several, only down-left and down apply; for a last child of several, only down and down-right apply; and for a middle child, only down applies. PropagateRendFeatures then provides the appropriate propagation rule in a call to ChildRendFeatures to obtain a list of feature values to be turned on in the child node. ChildRendFeatures creates this list by pushing onto the list the feature values of the parent as well those rendering feature values that are turned on in the parent's rendering rule; ChildRendFeatures only pushes onto the list those values that obey the propagation rule. Then ChildRendFeatures removes from the list those rendering features that are turned off for the parent.

The step in box 316 provides the feature values from box 314, and the step in box 318 makes a recursive cell to the sequence of steps in FIG. 13. PropagateRendFeatures makes this recursive call to the SEdit function SET-FORMAT for the child node, providing the list of feature values. Each recursive call begins by receiving the features provided, in box 318, and continues with a call to InternalRender as described above, but for the child node.

Through recursive calls, the sequence in FIG. 13 scans all of the nodes that are descendants of the starting node, propagating feature values downward within data structure 164. When all of the children of a given node have been scanned, the step in box 320 computes the node's width, or any other parameter that will be useful during regeneration. Because the width of a node depends on the widths of its children, this step propagates information upward within data structure 164. In the implementation of microfiche appendix A, this step can be performed by SEdit making a call to the Trollope routine ComputeWidth through COMPUTE-FOR-MAT-VALUE. Upon completion of the step in box 320, the sequence of steps in FIG. 13 returns to the procedure that called it.

Propagation of information downward and upward within data structure 164 is useful because of relationships between punctuational features. For example, if two or more quotes are in a nesting relationship, the outer quote will be bounded by double quotation marks, the next by single quotation marks, and so forth alternating between double and single quotation marks. Therefore, a change from a direct quote to an indirect quote, without quotation marks, will affect punctuation of any quotes nested within that quote. Similarly, the width of a node may affect line breaks. The preliminary scan need not always cover all of data structure 164, but can cover only a part that has been modified by a previous operation.

FIG. 14 shows steps performed during regeneration of a text sequence for display from data structure 164. The regeneration function of FIG. 14 is entered with a call that includes a node of data structure 164 and may also include a start index indicating a child of the node. In the implementation of microfiche appendix A, this call is an SEdit call to the Trollope function ExternalRender through LINEARIZE.

The step in box 332 determines whether a start index was received in box 330. If not, the regeneration operation affects all of the children of the node, as well as whatever punctuational features are inserted into the text sequence before the children. Therefore, the step in box 334 accesses the rendering rule of the current node, retrieves the string of codes that should appear before the first child of the node, and prints that string to the text sequence. If the rendering rule does not include any before string, then no punctuational features need be inserted before the children of the node. In the implementation of microfiche appendix A, ExternalRender prints with a call to PrintTokenString, providing the string from the rule with the call. PringTokenString then goes through the items in the string, providing an appropriate SEdit call based on whether the item is a string, a number, or a carriage return.

The test in box 340 determines whether the current node is a leaf node that contains text, in which case it has no children and its contents can be included directly in the text sequence. If so, the contents of the node are printed to the text sequence in box 342. In microfiche appendix A, ExternalRender calls TextNode? for the test in box 340; for the step in box 342, it calls Text to obtain the text of the node, and then calls PrintTokenString with the text. Text, in turn, calls Capitalize if the features or format of the node indicate its first letter should be capitalized.

If the test in box 340 determines that the node is not a leaf with text, the regeneration function of FIG. 14 begins an iterative loop on the children of the node. The test in box 344 determines whether any children remain to be handled. If so, the test in box 346 determines whether the next child is after the start index. If not, it is skipped over, and the loop iterates until a child is reached that is after the start index. If the test in box 350 determines that child is the first child, the step in box 352 then provides the child node and the step in box 354 makes a recursive call to the function of FIG. 14, the call being made without a start index. After the child node has been handled by the recursive call, the function returns to begin another iterative loop at box 344. This is implemented in microfiche appendix A by a call to the SEdit function LINEARIZE, in response to which SEdit calls ExternalRender with the same parameters.

If the test in box 350 determines that the child is not the first child, the step in box 356 prints the current node's separator string from its rendering rule. Then, if the current child is of the type after which a line break could be inserted, the step in box 358 determines whether a line break is necessary and, if so, inserts one. As above, ExternalRender calls PrintTokenString with the current node's separator string, if any, to implement the step in box 356. The separator string could, for example, be a space between words. ExternalRender calls LineBreak to determine whether a line break is necessary and, if so, to insert it. Then, as above, the step in box 352 provides the child node for a recursive call by the step in box 354.

When all the children of the current node have been handled, the step in box 360 prints the after string of the current node's rendering rule to the text sequence. As above, ExternalRender calls PrintTokenString with the current node's after string, if any, to implement the step in box 360. When this step is completed, the function of FIG. 14 returns to the procedure that called it.

The function of FIG. 14 is localized by conventional SEdit operations so that it operates only on a portion of data structure 164. SEdit identifies the portion to be regenerated and calls the appropriate node with an appropriate start index to regenerate that portion. SEdit can identify the portion to be regenerated based on where changes have been made in data structure 164.

SEdit must be able to map back and forth between the text sequence and data structure 164, in order to identify the node within data structure 164 that corresponds to a location to which the user is pointing. Conventional SEdit operations keep track of the relationship between each node of data structure 164 and the corresponding part of the text sequence. In addition, however, Trollope functions such as SetPoint and SetSelection are called by Sedit through SET-POINT and SET-SELECTION to assist in identifying an insertion point or a selection in an appropriate manner. SetPoint and SetSelection take into account the positions of before strings, separator strings, and after strings in determining the node for a point or selection. Only a node of data structure 164 can be an object of an SEdit operation in the implementation of microfiche appendix A.

The implementation of microfiche appendix A includes a number of additional features that facilitate the use of an autonomous punctuational grammar.

D. Miscellaneous Features.

While the features described above provide the basic functions of an editor, it is also appropriate to be able to edit the autonomous punctuational grammar and the related operations and rendering rules and to be able to save data structure 164 in a more compact form than is used during editing. As noted above in relation to TitleMenuFn, the implementation of microfiche appendix A provides these features through a title bar menu.

In response to a selection of one of the edit options in the title bar menu, EditRules sets up an SEdit window within which the grammar, the rendering rules, or the operations rules can be edited. When the grammar is edited, EditRules, calls OK? to check whether the existing data structure satisfies the new grammar; if not, the user is provided another opportunity to edit the grammar.

In response to a selection of one of the save options in the title bar menu, TrollopePut saves the data structure in a form readable either by TrollopeRead or by another editor, TEdit. The form readable by TrollopeRead can be referred to as an external text analysis representation (TAR), and is conveniently in a list format resulting from a call from TrollopePut to Trollope function TrollopeWrite and hence to ExternalizeTAR. When the list format is received by TrollopeRead, SEdit calls ParseTAR through PARSE-INFO, and ParseTAR in turn calls InternalizeTAR to convert the list format into the data structure appropriate for editing. Each node of the editing data structure includes an internalTAR that includes additional information used in Trollope editing.

6. Advantages and Other Uses of Autonomous Punctuational Grammar

The use of an autonomous punctuational grammar in editing can result in significant advantages. A few examples are as follows:

A. Because the data structure is checked for compliance with the grammar after any modification, the user is prevented from making many inadvertant typographical or textual errors that would otherwise require revision; for example, the correct number of spaces is automatically inserted between words or sentences, each sentence automatically begins with a capital letter, and the user is not permitted to enter unbalanced or incorrectly alternated parentheses, quotations and similar paired marks.

B. The selection mechanism only permits selection of a node in the data structure, so that the editor correctly selects text units like words, phrases, clauses, parentheticals, quotes, and sentences, and cannot be used to make a structurally meaningless selection.

C. The user can perform operations on selections without the need to clean up the punctuation afterwards. Movement of a cluse is illustrated in FIG. 1, but there are many other examples. If the first word in a sentence is deleted, the new first word is automatically capitalized. Two text units, such as two sentences, can be combined into one, or one text unit can be divided into two, through merge and split operations that correct spacing, punctuation marks, and capitalization. A text unit can be moved to an insertion point of inappropriate type, in which case a correct structure will, if possible, be rebuilt by inserting or deleting intervening structure units; for example, if a phase is moved to a paragraph insertion point, intervening paragraph and sentence textual units can be inserted so that the insertion becomes a single-sentence paragraph, punctuated accordingly. Nested quotations can be copied or moved without correcting the quotation marks to obtain proper alternation between single and double quotes and without correcting the positions of punctuation marks such as periods within the closing quotation marks.

But editing is not the only use of an autonomous punctuational grammar in processing natural language text. An autonomous punctuational grammer could also be used, for example, to parse or analyze a natural language text into textual units. For example, characters in an unstructured text could be read one by one from a file, with each treated in turn as an editing insertion signal, to build a data structure corresponding to the text. Since natural language text does not have an explicit autonomous punctuational structure, an important step in analyzing a natural language text is to resolve ambiguities in punctuational structure. To indicate its autonomous punctuational structure, the text can be converted to a tree-like data structure that includes data or can be annotated with structure data.

A special set of rules, referred to as a structure building grammar, could be developed to convert text to an autonomous punctuational data structure. For example, a structure building grammar could map from input actions on the keyboard and mouse to textual units in the data structure. In other words, the terminal symbols of the grammar could correspond to input actions rather than to abstract letters of the alphabet as in the grammar of textual types, while the non-terminal symbols could correspond to the non-terminal symbols of the grammar of textual types. The rules of the grammar would therefore tell how to build a data structure from the input actions. This specification could then be used with parser-generator technology to create a state machine for an editor.

7. Miscellaneous

Many variations can be made within the scope of the invention. For example, the user interface to a system need not be an ordinary editor, but could be an educational user interface to assist someone learning correct punctuation or a punctuation checking interface to identify punctuation errors. The invention could be implemented in a wide variety of ways, such as with an extensible structure editor that could also be used with programming languages. The implementation in microfiche appendix A could be modified in many ways, as suggested in comments in several functions in microfiche appendix A. Another approach to the use of a grammar of textual types for processing natural language text is described in copending, coassigned U.S. patent application Ser. No. 07/274,261, entitled "Editing Based on Punctuational Structure," incorporated herein by reference.

Another technique related to the invention is a rule-based method for converting a parse-tree-like representation of text analyzed according to textual types into a linear string of text including words and punctuational features. One set of rules tells how to convert each textual type instance into a locally correct string of text and embedded punctuational features. A second set of rules tells how punctuational features so produced in linear text may interact locally (that is, in juxtaposition) to eventually produce a globally correct result.

For example, here are possible rules of the first type for several textual types: a word is linearized as the sequence of its constituent characters followed by a space; a phrase as the sequence of its constituents followed by a comma; a sentence as the sequence of its constituents preceded by a "capitalization feature" and followed by a period and a space. Notice that the punctuational features introduced by the first set of rules can be distinguished from actual punctuation marks. Instead, these features are provided with "realization rules" which typically specify realization with a punctuation mark (thus, a comma feature is realized with a comma character), but may work in other ways. An example is the "capitalization feature" mentioned above, which is realized by capitalizing the first alphabetic character in the first word to its right. Thus, in addition to applying the first and second set of rules in sequence, the realization rules must be applied to punctuational features in order to obtain strings of characters that can be conveniently sent to a display or stored in a file.

The second set of rules governs interactions between pairs of punctuational features in the strings generated by the first set of rules. All interactions between punctuational features are of two basic kinds: absorption, in which one of a juxtaposed pair disappears, and transposition, in which the sequence of two punctuational features is reversed. For example, when comma and period are juxtaposed, the comma disappears. When right quote and period are juxtaposed in that order, they should be transposed. Similarly, a transposition rule applies to space followed by marks such as comma, semicolon, period, etc. The generation of correctly punctuated text from parse trees derived from the autonomous punctuational grammar can be greatly simplified and systematized by the use of these ideas. In addition, the punctuational features introduced by the first set of rules can optionally be given a directionality, so that they "stick" to tokens to their left or right. In this way, the issue of deciding where line breaks may be introduced can be systematized. For example, if right parentheses stick to the left, we can be sure that no lines will be broken between a word and the right parenthesis following it.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed is:

1. A method comprising steps of:

storing first text data representing a first natural language text that includes a first set of words and a first set of punctuational features with positions relative to the first set of words; the first text data including first structure data indicating types of a first set of text units at the boundaries of which the first set of punctuational features are positioned, the first structure data further indicating nesting relationships between the first set of words and the first set of text units such that the first set of punctuational features and their positions relative to the first set of words can be determined from the first structure data; and operating on the first text data to produce second text data representing a second natural language text that is different from the first natural language text; the second natural language text including a second set of words and a second set of punctuational features with positions relative to the second set of words; the second text data including second structure data indicating types of a second set of text units at the boundaries of which the second set of punctuational features are positioned, the second structure data further indicating nesting relationships between the second set of words and the second set of text units such that the second set of punctuational features and their positions relative to the second set of words can be determined from the second structure data.

2. The method of claim 1 in which the first set of words and the second set of words include the same words, first set of words being in a different order than the second set of words, the first set of punctuational features being different than the second set of punctuational features.

3. The method of claim 2 in which the first text data has a plurality of levels of nodes, each node representing a respective one of the first set of text units; the levels of nodes including a top level and at least one lower level below the top level, the first structure data including first linking data indicating a first set of links between the nodes; the step of operating on the first text data to produce the second text data comprising a substep of modifying the first linking data to produce second linking data, the second linking data indicating a second set of links different than the first set of links.

4. The method of claim 1 in which the step of operating on the first text data to produce the second text data comprises a substep of determining whether the second structure data indicate types and nesting relationships such that the second set of punctuational features and their positions relative to the second set of words can be determined from the second structure data.

5. The method of claim 4 in which the determining substep comprises a substep of applying a set of rules to the second structure data, each rule indicating, for any text unit of one of the types, types of other text units into which the text unit can be divided.

6. A method comprising steps of:

storing text data representing a natural language text that includes words and punctuational features with positions relative to the words; the text data including structure data indicating types of text units at the boundaries of which the punctuational features are positioned, the structure data further indicating nesting relationships between the words and the text units such that the punctuational features and their positions relative to the words can be determined from the structure data; and operating on the text data to produce codes indicating the words and the punctuational features in the natural language text; the step of operating on the text data comprising a substep of determining the punctuational features and their positions relative to the words from the structure data; the codes produced by the step of operating on the text data being in a sequence such that the codes indicate that the punctuational features are in their positions relative to the words as determined from the structure data.

7. The method of claim 6 in which the step of operating on the text data comprises a substep of applying a rule from a set of rules to the structure data.

8. The method of claim 7 in which the step of operating on the text data further comprises a substep of including punctuation codes in the code sequence in accordance with the structure data included in the text data.

9. The method of claim 8 in which the step of operating on the text data further comprises, prior to the substep of including the punctuation codes, a substep of propagating information relating to punctuational features through the text data.

10. The method of claim 6, further comprising steps of:

presenting the natural language text to a user based on the code sequence;

receiving signals from the user, the signals including selection data indicating a selected part of the presented natural language text; and mapping the selection data onto the text data to identify a selected part of the text data.

11. The method of claim 10 in which the signals received in the receiving step further include operation data indicating an operation to be performed on the selected part of the presented natural language text; the method further comprising a step of performing the indicated operation by modifying the text data to produce modified text data representing a modified natural language text that is different from the natural language text represented by the text data prior to the step of performing the indicated operation.

12. The method of claim 11 in which the modified natural language text includes a modified set of words and a modified set of punctuational features with positions relative to the modified set of words; the modified text data including modified structure data indicating types of the modified set of text units at the boundaries of which the modified set of punctuational features are positioned, the modified structure data further indicating nesting relationships between the modified set of words and the modified set of text units; the step of performing the indicated operation further comprising a substep of determining whether the modified structure data indicate types and nesting relationships such that the modified set of punctuational features and their positions relative to the modified set of words can be determined from the modified structure data.

13. The method of claim 11, further comprising the steps of:
   accessing the modified text data;
   regenerating a modified code sequence from the modified text data; the modified code sequence including codes that indicate words and punctuational features in the modified natural language text; the regenerating step comprising a substep of including punctuation codes in the modified code sequence in accordance with the structure data; and
   presenting a modified natural language text to the user based on the modified code sequence.

14. The method of claim 11 in which the signals received in the receiving step further include position data indicating a position within the presented natural language text at which to perform the indicated operation; the performing step comprising mapping the position data onto the text data to identify a position within the text data corresponding to the position within the presented natural language text and performing the indicated operation at that position.

15. A method comprising steps of:
   obtaining codes representing a natural language text that includes words and punctuational features, the codes being in a sequence such that the codes indicate that the punctuational features are in positions relative to the words; and
   operating on the codes to produce text data representing the natural language text; the text data including structure data indicating types of text units at the boundaries of which the punctuational features are positioned, the structure data further indicating nesting relationships between the words and the text units such that the punctuational features and their positions relative to the words as indicated by the codes can be determined from the structure data.

16. The method of claim 15 in which the step of operating on the codes comprises a substep of applying a set of rules to the codes representing the natural language text to obtain the structure data.

17. The method of claim 16 in which the applying substep comprises a substep of analyzing the natural language text into text units, each text unit having a respective one of the types: the step of operating on the codes further comprising a substep of including in the structure data, for each text unit, a structure code indicating its type.

18. The method of claim 15 in which the step of operating on the codes comprises a substep of analyzing the natural language text into the text units.

19. A data structure produced for use in a system that includes:
   memory for storing the data sturcture; and
   a processor connected for accessing the data structure when stored in the memory;
   the data structure comprising text data representing a natural language text that includes words and punctuational features with positions relative to the words; the text data comprising structure data indicating types of text units at the boundaries of which the punctuational features are positioned, the structure data further indicating nesting relationships between the words and the text units such that the processor can access the text data and use the structure data to determine the punctuational features and their positions relative to the words when the data structure is stored in the memory.

20. The data structure of claim 19 in which the structure data comprises, for each text unit, a structure code indicating its type.

21. The data structure of claim 19 in which the text data has a plurality of levels of nodes, each node representing a respective one of the text unit; the level of nodes including a top level and at least one lower level below the top level, the structure data including linking data linking a first node at one of the lower levels to a second node at a level above that lower level, the second node's respective text unit including the first node's respective text unit.

22. The data structure of claim 21 in which the levels of nodes and the linking data form a tree.

23. The data structure of claim 19 in which the text data includes a sequence of text data unit that indicate words in the natural language text and a sequence of sturcture data units, each structure data unit being parallel to a respective one of the text data units and including a part of the structure data relating to the respective text data unit.

24. A system comprising:
   memory for storing text data representing a natural language text that includes words and punctuational features with positions relative to the words; the text data including structure data indicating types of text units at the boundaries of which the punctuational features are positioned, the structure data further indicating nesting relationships between the words and the text units such that the structure data can be used to detrermine the punctuational features and their positions relative to the words; and
   a processor connected for accessing the text data when stored in the memory, the processor comprising means for using the structure data to determine the punctuational features and their positions relative to words.

25. The system of claim 24 further commprising a stored set of rules, each rule indicating, for any text unit of one of the types, types of other text units into which the text unit can be divided; the means for using the structure data determining the punctuational features and their positions relative to the words by applying rules from the stored set of rules.

26. The system of lcaim 24 in which the processor further comprises means for regenerating the natural language text from the text data by producing a sequence of codes including punctuation mark codes indicating the punctuational features as determined by the means for using the structure data.

27. The system of claim 26 further comprising a display and a user input device; the processor further comprising means for representing the regenerated natural language text to a user on the display and means for receiving signals from the user through the user input device.

28. The system of claim 27 in which the signals include selection data indicating a selected part of the regenerated natural language text; the processor further comprising means for mapping the selection data onto the text data to identify a selected part of the text data.

29. The system of clim 28 in which the signals further include operation data indicating operation to be performed on the selected part of the regenerated natural language text; the processor further comprising means for performing the indicated operation by modifying the text data by modifying the structure data.

30. The system of claim 29 in which the processor further comprises means for generating a modified natural language text from the modified text data by producing a modified sequence of codes including punctuation mark codes indicating punctuational features as determined from the modified structure data by the means for using the sturcture data.

31. The system of claim 29 in which the signals further include position data indicating a position withiln the regenerated natural language text at which to perform the indicated operation; the processor further comprising means for mapping the position data onto the text data to identify a position within the text data corresponding to the position within the regenerated natural language text, the means for performing the indicated operation performing the indicated operation at that position.

* * * * *